US006480679B1

(12) United States Patent
Ishida et al.

(10) Patent No.: US 6,480,679 B1
(45) Date of Patent: Nov. 12, 2002

(54) STROBE DEVICE FOR IMAGE CAPTURING APPARATUS, CAMERA AND LENS FITTED FILM UNIT, AND REFLECTOR OF STROBE LIGHT

(75) Inventors: Ken Ishida, Hino (JP); Takuro Masuda, Hino (JP); Nobuyoshi Mori, Hino (JP); Takao Hosaka, Hino (JP)

(73) Assignee: Konica Corporation (JP)

(*) Notice: Subject to any disclaimer, the term of this patent is extended or adjusted under 35 U.S.C. 154(b) by 0 days.

(21) Appl. No.: 09/610,453

(22) Filed: Jul. 5, 2000

(30) Foreign Application Priority Data

| Jul. 5, 1999 | (JP) | 11-190776 |
| Aug. 12, 1999 | (JP) | 11-228576 |
| Aug. 12, 1999 | (JP) | 11-228577 |
| Aug. 12, 1999 | (JP) | 11-228578 |
| Nov. 12, 1999 | (JP) | 11-322531 |
| Dec. 17, 1999 | (JP) | 11-358974 |

(51) Int. Cl.[7] .................. G03B 15/03; G03B 15/06; G03B 15/02
(52) U.S. Cl. .................. 396/164; 396/200; 362/17; 362/18
(58) Field of Search .................. 396/155, 200, 396/164; 362/3, 16, 17, 18

(56) References Cited

U.S. PATENT DOCUMENTS

| 4,025,933 A | 5/1977 | Berg .................. 354/141 |
| 4,190,880 A | 2/1980 | Esaki .................. 362/18 |
| 4,223,373 A | 9/1980 | Collins et al. .................. 362/13 |
| 4,329,735 A | 5/1982 | Kawazoe .................. 362/18 |
| 4,533,984 A | 8/1985 | Gatton .................. 362/232 |
| 5,394,307 A | * 2/1995 | Matsuura .................. 362/16 |
| 5,772,302 A | * 6/1998 | Ishikawa et al. .................. 362/3 |
| 5,999,751 A | * 12/1999 | Immura et al. .................. 396/200 |
| 6,011,929 A | * 1/2000 | Fuke et al. .................. 396/175 |
| 6,078,752 A | * 6/2000 | Tenmyo .................. 396/176 |
| 6,222,995 B1 | * 4/2001 | Uchida .................. 396/6 |

* cited by examiner

Primary Examiner—David M. Gray
Assistant Examiner—Rochelle Blackman
(74) Attorney, Agent, or Firm—Cantor Colburn LLP

(57) ABSTRACT

There is described a strobe device particularly suited for image capturing apparatus equipped with wide-angle lens. The strobe device includes a reflector to reflect a strobe light, a light-emitting tube to emit the strobe light and an optical panel to transmits the strobe light. In the strobe device embodied in the present invention, a maximum luminous intensity of the strobe light, illuminated by the strobe device, is arranged in a direction being different from a direction of a strobe light axis.

29 Claims, 28 Drawing Sheets

LIGHT SOURCE

LIGHT SOURCE

850

STROBE DEVICE FOR IMAGE CAPTURING APPARATUS, CAMERA AND LENS FITTED FILM UNIT, AND REFLECTOR OF STROBE LIGHT

BACKGROUND OF THE INVENTION

The present invention relates to a strobe device, incorporated with a silver-halide camera, a lens-fitted film unit and a digital camera, and specifically, relates to a strobe device which is suitable for a camera equipped with a wide angle lens, an image capturing apparatus equipped with a strobe device and a reflector of the strobe light.

FIG. 1 shows distribution characteristics of the luminous intensity for a conventional strobe device. As shown in FIG. 1, in a conventional strobe device, luminous intensity of strobe lighting is substantially constant within a predetermined illuminating angle, or the luminous intensity at the center position is greater than that at the peripheral positions, so as to increase the guide number in regard to the illuminating distance along the center axis.

In the distribution characteristics of the luminous intensity described above, however, when capturing a subject, like as a flat surface, directly opposite the camera or subjects aligned in the vertical direction, the larger the angle of view, the larger the distance between the peripheral subject and the strobe device, and thereby, luminous intensity for the peripheral subject would decrease due to the low of inverse square, and the reflected light from the subject would also decrease according as the distance becomes larger.

In addition, the amount of light components, coming toward the camera after being reflected and scattered on a plane object such as a wall, etc., would also decrease, due to the large angle of incident of the light illuminated by the strobe device.

Further, since the peripheral subjects are usually located at distant positions in almost all conventional snapshot images, compared to the subject located in the center position, the reflected light intensity from such peripheral subjects will decrease considerably.

Owing to the multiple-effects of the adverse factors mentioned above, the periphery portion is apt to be dark in the photograph shot with conventional strobe lighting, resulting in a lack of liveliness, in which only the center portion is remarkably bright, while the periphery portion is a flat and expressionless field. This tendency will become remarkable according as the illuminating angle of strobe device is getting larger with the increase of the angle of view, by employing a wide-angle lens for the camera.

Now, referring to FIG. 6, an example of the relationship, between viewing angle a of a photographic lens in a camera employing a strobe device and illuminating angle β of the light coming to subject M from the strobe device, will be described in the following.

As shown in FIG. 6(a), when viewing angle a is relatively small (for instance, 60 degrees) as a standard type, it is possible to adequately illuminate subject M existing within viewing angle a, even if illuminating angle β of the strobe device is not so wide.

As shown in FIG. 6(b), however, when a wide-angle photographic lens having a wide viewing angle a (for instance, 90 degrees) is employed in the camera, it becomes almost impossible to adequately illuminate the overall region covered by viewing angle a with illuminating angle β of a conventional strobe device, resulting in difficulties of improving photographic effects of subject M.

SUMMARY OF THE INVENTION

To overcome the abovementioned drawbacks in conventional strobe devices, it is an object of the present invention to provide a strobe device, which could brightly illuminate a periphery of the subject and, specifically, makes it possible to obtain a desirable distribution characteristics of the luminous intensity, even when an image capturing is conducted with a wide-angle photographic lens.

Accordingly, to overcome the cited shortcomings, the abovementioned objects of the present invention can be attained by strobe devices and image capturing apparatus described as follow.

(1) A strobe device, comprising a reflector to reflect a strobe light, a light-emitting tube, mounted in an interior of the reflector, to emit the strobe light and an optical panel, mounted in front of the light-emitting tube, to transmits the strobe light, wherein a maximum luminous intensity of the strobe light, illuminated by the strobe device, is arranged in a direction being different from a direction of a strobe light axis which is orthogonal to a longitudinal direction of the light-emitting tube.

(2) The strobe device of item 1, which fulfills a following conditional equation, $$[4\times\{(\cos(K_P))^{-4}-1\}\times Q_C]+Q_C \geq Q_{KP} \geq [0.1\times\{(\cos(K_p))^{-4}-1\}\times Q_C]+Q_C$$

where: $K_P$; an illumination angle for the maximum luminous intensity with reference to the strobe light axis, $Q_C$; a luminous intensity in a direction of the strobe light axis $Q_{KP}$; the maximum linous intensity.

(3) The strobe device of item 1, wherein the reflector comprises a concave reflection surface and a side reflection surface arranged at each side of the concave reflection surface, the side reflection surface is inclined to the light-emitting tube at such an angle that the side reflection surface reflects the strobe light, emitted from the light-emitting tube, so as to emit the strobe light toward a direction of being apart from the strobe light axis located at a center of the light-emitting tube, instead of toward a direction of crossing the strobe light axis.

(4) The strobe device of item 3, wherein each of the side reflection surfaces comprises a sub-reflection surface being orthogonal to a longitudinal direction of the light-emitting tube.

(5) The strobe device of item 1, which fulfills a following conditional equation, $$1.5 \leq W/L \leq 2.0,$$

where: L; an effective illuminating length of the light-emitting tube, W; a length of the strobe panel in a longitudinal direction of the light-emitting tube.

(6) The strobe device of item 1, wherein the light-emitting tube is formed in a cylindrical shape and the reflector comprises a concave reflection surface, the strobe device fulfills following conditional equations, $$3.0U < W1 < 5.2U$$

$$1.2U < W2 < 3.5U$$

$$2U < D < 5U$$

where: W1; a width at a front end of the concave reflection surface, W2; a width of the concave reflection surface at a center axis of the light-emitting tube, D; a distance from a front end of the concave reflection surface to a center axis of the light-emitting tube, and U; a distance from a center axis of the light-emitting tube to a rear end of the concave reflection surface.

(7) The strobe device of item 1, wherein the light-emitting tube is formed in a cylindrical shape and the reflector comprises a concave reflection surface, and in regard to a cross-sectional view of the concave reflection surface in a direction orthogonal to a longitudinal direction of the light-emitting tube, when a front end point of the concave reflection surface, an intersection of the concave reflection surface and a straight line, which goes through a center axis of the light-emitting tube and is perpendicular to the strobe light axis, and a rear end point of the concave reflection surface on the strobe light axis, are defined as P, Q and V, respectively, all of points, residing on the concave reflection surface between points P and Q, are located opposite a center axis of the light-emitting tube with respect to a line P-Q, while all of points, residing on the concave reflection surface between points Q and V, are located opposite a center axis of the light-emitting tube with respect to a line Q-V, and under the above condition, the strobe device fulfills following conditional equations, $$0.05 < \Delta 1/U < 0.4$$

$$0.07 < \Delta 2/U < 0.5$$

where: $\Delta 1$; a maximum distance from a point, residing on the concave reflection surface between points P and Q, to the line P-Q, $\Delta 2$; a maximum distance from a point, residing on the concave reflection surface between points Q and V, to the line Q-V, and U; a distance from a center axis of the light-emitting tube to a rear end of the concave reflection surface.

(8) The strobe device of item 6, wherein the light-emitting tube is apart from the concave reflection surface.

(9) The strobe device of item 6, which fulfills a following conditional equation, $$0.5 < T/U < 1.5$$

where: T; an outer diameter of the light-emitting tube.

(10) The strobe device of item 1, wherein the optical panel comprises a light diverging section, located at a center area in a longitudinal direction of the light-emitting tube, to diverge the strobe light toward periphery, the light diverging section comprises at least one of such surfaces as a Fresnel lens, a negative lens and a row of prisms.

(11) The strobe device of item 10, wherein, in a longitudinal direction of the light-emitting tube, a length of the light diverging section is 90%–120% of a length of the light-emitting tube located within an interior of the reflector.

(12) The strobe device of item 10, wherein, in a longitudinal direction of the light-emitting tube, a length of the light diverging section is 70%–120% of a length of the light-emitting tube located within an interior of the reflector.

(13) The strobe device of item 1, wherein the strobe device exhibits a maximum luminous intensity within a range of viewing angle in a direction of at least one of a long side, a short side and a diagonal of a photographed image frame projected by a photographic lens, which is incorporated in an image capturing apparatus equipped with the strobe device.

(14) The strobe device of item 1, wherein the strobe device exhibits a maximum luminous intensity without a range of viewing angle in a direction of at least one of a long side, a short side and a diagonal of a photographed image frame projected by a photographic lens, which is incorporated in an image capturing apparatus equipped with the strobe device.

(15) The strobe device of item 13, which fulfills a following conditional equation, $$(4/3) \times A \geq K_P \geq (1/5) \times A$$

where: A; a half viewing angle of the photographic image frame in a predetermined direction, $K_P$; an illumination angle for the maximum luminous intensity in the predetermined direction with reference to the strobe light axis.

(16) An image capturing apparatus, comprising a photographic lens and a strobe device, which comprises a reflector to reflect a strobe light forward, a light-emitting tube, mounted in an interior of the reflector, to emit the strobe light, and an optical panel, mounted in front of the light-emitting tube, to transmits the strobe light, wherein a maximum luminous intensity of the strobe light, illuminated by the strobe device, is arranged in a direction being different from a direction of a strobe light axis which is orthogonal to a longitudinal direction of the light-emitting tube.

(17) The image capturing apparatus of item 16, which fulfills a following conditional equation, $$[4 \times \{(\cos(K_P))^{-4} - 1\} Q_C] + Q_C \geq Q_{KP} \geq [0.1 \times \{(\cos(K_P))^{-4} - 1\} \times Q_C] + Q_C$$

where: $K_P$; an illumination angle for the maximum luminous intensity with reference to the strobe light axis, $Q_C$; a luminous intensity in a direction of the strobe light axis, $Q_{KP}$; the maximum luminous intensity.

(18) The image capturing apparatus of item 16, wherein the reflector comprises a concave reflection surface and a side reflection surface arranged at each side of the concave reflection surface, the side reflection surface is inclined to the light-emitting tube at such an angle that the side reflection surface reflects the strobe light, emitted from the light-emitting tube, so as to emit the strobe light toward a direction of being apart from the strobe light axis located at a center of the optical panel, instead of toward a direction of crossing the strobe light axis.

(19) The image capturing apparatus of item 16, wherein the light-emitting tube is formed in a cylindrical shape and the reflector comprises a concave reflection surface, the strobe device fulfills following conditional equations, $$3.0U < W1 < 5.2U \qquad (1)$$

$$1.2U < W2 < 3.5U \qquad (2)$$

$$2U < D < 5U \qquad (3)$$

where: W1; a width at a front end of the concave reflection surface, W2; a width of the concave reflection surface at a center axis of the light-emitting tube, D; a distance from a front end of the concave reflection surface to a center axis of the light-emitting tube, and U; a distance from a center axis of the light-emitting tube to a rear end of the concave reflection surface.

(20) The image capturing apparatus of item 16, wherein the optical panel comprises a light diverging section, located at a center area in a longitudinal direction of the light-emitting tube, to diverge the strobe light toward periphery, the light diverging section comprises at least one of such surfaces as a Fresnel lens, a negative lens and a row of prisms.

(21) The image capturing apparatus of item 16, wherein the strobe device exhibits a maximum luminous intensity within a range of viewing angle in a direction of at least one of a long side, a short side and a diagonal of a photographed image frame projected by the photographic lens.

(22) The image capturing apparatus of item 16, wherein the strobe device exhibits a maximum luminous intensity without a range of viewing angle in a direction of at least one of a long side, a short side and a diagonal of a photographed image frame projected by the photographic lens.

(23) The image capturing apparatus of item 16, which fulfills a following conditional equation, $$(4/3) \times A \geq K_P \geq (1/5) \times A$$

where: A; a half viewing angle of the photographic image frame in a predetermined direction, $K_P$; an illumination angle for the maximum luminous intensity with reference to the strobe light axis.

(24) The image capturing apparatus of item 16, wherein the image capturing apparatus is a lens-fitted film unit equipped with the strobe device.

(25) The image capturing apparatus of item 16, wherein the image capturing apparatus is a silver-halide film camera equipped with the strobe device.

Further, to overcome the abovementioned problems, other strobe devices and image capturing apparatus, embodied in the present invention, will be described as follow:

(26) A strobe device, characterized in that a strobe light, emitted to a subject within a predetermined range, has a maximum luminous intensity in a range corresponding to a viewing angle at least at one of a long side, a short side and a diagonal of a photographed image frame formed by a photographic lens, in a direction being different from a direction of a strobe light axis which is parallel to a optical axis of the photographic lens.

(27) The strobe device of item 26, characterized in that the strobe device fulfills a following conditional equation, when a luminous intensity emitted in a direction of the strobe light axis, an illumination angle for the maximum luminous intensity with reference to the strobe light axis, and the maximum luminous intensity are defined as $Q_C$, $K_P$ and $Q_{KP}$, respectively.

$$[4 \times \{(\cos(K_P))^{-4} - 1\} \times Q_C] + Q_C \geq Q_{KP} \geq [0.1 \times \{(\cos(K_P))^{-4} - 1\} \times Q_C] + Q_C$$

(28) The strobe device of item 26, characterized in that the strobe device fulfills a following conditional equation, when a luminous intensity emitted in a direction of the strobe light axis, an illumination angle for the maximum luminous intensity with reference to the strobe light axis, and the maximum luminous intensity are defined as $Q_C$, $K_P$ and $Q_{KP}$, respectively.

$$[2 \times \{(\cos(K_P))^{-4} - 1\} \times Q_C] + Q_C \geq Q_{KP} \geq [0.1 \times \{(\cos(K_P))^{-4} - 1\} \times Q_C] + Q_C$$

(29) The strobe device described in one of items 26–28, characterized in that the illumination angle ($K_P$ degree) for the maximum luminous intensity with reference to the strobe light axis fulfills a following conditional equation, when a predetermined half viewing angle of the photographic image frame is defined as A degree.

$$(4/3) \times A \geq K_P \geq (1/5) \times A$$

(30) The strobe device described in one of items 26–28, characterized in that the illumination angle ($K_P$ degree) for the maximum luminous intensity with reference to the strobe light axis fulfills a following conditional equation, when a predetermined half viewing angle of the photographic image frame is defined as A degree.

$$(9/10) \times A \geq K_P \geq (1/5) \times A$$

(31) The strobe device described in one of items 26–28, characterized in that the illumination angle ($K_P$ degree) for the maximum luminous intensity with reference to the strobe light axis fulfills a following conditional equation, when a predetermined half viewing angle of the photographic image frame is defined as A degree.

$$(9/10) \times A \geq K_P \geq (1/2) \times A$$

(32) The strobe device described in one of items 26–31, characterized in that the strobe light has a maximum luminous intensity in a range corresponding to the viewing angle at the long side of the photographed image frame in a direction being different from a direction of the strobe light axis which is parallel to the optical axis of the photographic lens.

(33) The strobe device of item 32, characterized in that the illumination angle ($K_P$ degree) for the maximum luminous intensity with reference to the strobe light axis fulfills a following conditional equation, when the half viewing angle of the long side of the photographic image frame is defined as $A_L$ degree.

$$(4/3) \times A_L \geq K_P \geq (1/5) \times A_L$$

(34) A strobe device, characterized in that a strobe light, emitted to a subject within a predetermined range, has a maximum luminous intensity in a direction being larger than a viewing angle at least at one of a long side, a short side and a diagonal of a photographed image frame formed by the photographic lens.

(35) A strobe device, characterized in that the strobe device comprises a concave reflection surface to reflect a light emitted from a light-emitting tube and a side reflection surface arranged at each side of the concave reflection surface, and an angle of the side reflection surface versus the light-emitting tube is set at such an angle that the side reflection surface reflects the light, emitted from the light-emitting tube, in a direction of being apart toward both sides of the light-emitting tube.

(36) The strobe device of item 35, characterized in that the side reflection surface comprises a sub-reflection surface, which is orthogonal or substantially orthogonal to the light-emitting tube and is located at the protruded end of the side reflection surface.

(37) The strobe device of item 35 or item 36, characterized in that the strobe device fulfills a following conditional equation, when a length of an effective light-emitting section of the light-emitting tube and a length of a strobe panel, arranged in front of the concave reflector surface and both of the side reflection surfaces, along the longitudinal direction of the light-emitting tube, are defined as L and W.

$$1.5 \geq W/L \geq 2.0,$$

(38) A camera, equipped with a strobe device, characterized in that the camera comprises the strobe device to illuminate a subject with a light emitted from a light-emitting tube, and the strobe device comprises a concave reflection surface to reflect the light emitted from the light-emitting tube and a side reflection surface arranged at each side of the concave reflection surface, and an angle of the side reflection surface versus the light-emitting tube is set at such an angle that the side reflection surface reflects the light, emitted from the light-emitting tube, in a direction of being apart from a direction being orthogonal to the light-emitting tube.

(39) The camera, equipped with a strobe device, of item 38, characterized in that the side reflection surface comprises a sub-reflection surface, which is orthogonal or substantially orthogonal to the light-emitting tube and is located at the protruded end of the side reflection surface.

(40) A lens-fitted film unit, equipped with a strobe device, characterized in that the lens-fitted film unit, in which an unexposed film is loaded beforehand, comprises the strobe device to illuminate a subject with a light emitted from a light-emitting tube, and the strobe device comprises a concave reflection surface to reflect the light emitted from the light-emitting tube and a side reflection surface arranged at each side of the concave reflection surface, and an angle of the side reflection surface versus the light-emitting tube is set at such an angle that the side reflection surface reflects the light, emitted from the light-emitting tube, in a direction of being apart from a direction being orthogonal to the light-emitting tube.

(41) The lens-fitted film unit, equipped with a strobe device, of item 40, characterized in that the side reflection surface comprises a sub-reflection surface, which is orthogonal or substantially orthogonal to the light-emitting tube and is located at the protruded end of the side reflection surface.

(42) A light-sealing structure, characterized in that the light-sealing structure seals a light entering into a joint region of both members by joining a convex portion formed on one of members with a concave portion formed on another member, and a rough-forging section is formed on at least one of surfaces of the convex portion and the concave portion.

(43) The light-sealing structure of item 42, characterized in that a top-end surface of the convex portion at one of members contacts a bottom of the concave portion at the other member.

(44) The light-sealing structure of item 42 or item 43, characterized in that a rise angle of convex portion at one of members and a fall angle of concave portion at the other member are set at an angle in a range of 3°–45°, respectively.

(45) The light-sealing structure described in one of items 42–44, characterized in that the height of convex portion at one of members and the depth of concave portion at the other member are set at a size in a range of 0.3 mm–1.5 mm, respectively.

(46) The light-sealing structure described in one of items 42–45, characterized in that the one member having the convex portion and the other member having the concave portion are arranged at such a position as facing a film conveyance region of an opt-photographic apparatus which captures images on the film.

(47) A strobe device, characterized in that, in the strobe device comprising a light-emitting tube formed in a cylindrical shape and a reflector, a cross-sectional shape of an inner surface of the reflector in a direction orthogonal to a longitudinal direction of the light-emitting tube fulfills following conditional equations.

$$3.0U < W1 < 5.2U$$

$$1.2U < W2 < 3.5U$$

$$2U < D < 5U$$

where: W1; a width at a front end, W2; a width at a center axis of the light-emitting tube, D; a distance from a front end of to a center axis of the light-emitting tube, and U; a distance from a center axis of the light-emitting tube to a rear end.

(48) The strobe device of item 47, characterized in that, the following conditional equations are fulfilled.

$$3.0U < W1 < 4.7U$$

$$1.2U < W2 < 3.2U$$

$$2U < D < 5U$$

(49) The strobe device of item 48, characterized in that the following conditional equations are fulfilled.

$$3.2U < W1 < 4.0U$$

$$2.0U < W2 < 3.0U$$

$$2.5U < D < 4U$$

(50) The strobe device described in one of items 47–49, characterized in that, in regard to a cross-sectional shape of the concave reflection surface at both sides centered on a strobe light axis, when a front end point, an intersection with a straight line, which goes through a center axis of the light-emitting tube and is perpendicular to the strobe light axis, and a rear end point on the strobe light axis, are defined as P, Q and V, respectively, all of points, residing between points P and Q, are located opposite a center axis of the light-emitting tube with respect to a line P-Q, while all of points, residing between points Q and V, are located opposite a center axis of the light-emitting tube with respect to a line Q-V, and, when a maximum distance from a point, residing between points P and Q, to the line P-Q and a maximum distance from a point, residing between points Q and V, to the line Q-V are defined as Δ1 and Δ2, respectively, the following conditional equations are fulfilled.

$$0.05 < \Delta1/U < 0.4$$

$$0.07 < \Delta2/U < 0.5$$

(51) The strobe device of item 50, characterized in that the following conditional equations are fulfilled.

$$0.1 < \Delta1/U < 0.3$$

$$0.12 < \Delta2/U < 0.3$$

(52) The strobe device described in one of items 47–50, characterized in that the light-emitting tube is apart from the concave reflection surface.

(53) The strobe device described in one of items 47–51, characterized in that the following conditional equation is fulfilled, when an outer diameter of the light-emitting tube is defined as T.

$$0.5 < T/U < 1.5$$

(54) A strobe device, characterized in that, in the strobe device which comprises a light-emitting tube formed in a cylindrical shape and a optical panel mounted in front of a reflector, the optical panel comprises a light diverging section, located at a center area of the optical panel, to diverge a light beam toward periphery, and the light diverging section comprises such surfaces as a Fresnel lens, a negative lens and a row of prisms, in which a plurality of prisms are arranged in parallel.

(55) The strobe device of item 54, characterized in that a length of the light diverging section in a longitudinal direction of the light-emitting tube is formed as substantially the same length of the light-emitting tube positioned in an interior of the reflector in a longitudinal direction of the light-emitting tube.

(56) The strobe device of item 54, characterized in that a length of the light diverging section in a longitudinal direction of the light-emitting tube is 90%–120% of a length of a light-emitting section at which the light-emitting tube emits a light in a longitudinal direction.

(57) The strobe device described in one of items 54–56, characterized in that the light diverging section is either a Fresnel surface or a row of prisms, which is arranged in parallel only in a direction orthogonal to the longitudinal direction of the light-emitting tube.

(58) The strobe device described in one of items 54–57, characterized in that a flat surface section is formed at the center of the light diverging section.

(59) The strobe device described in one of items 54–57, characterized in that a concave cylindrical lens surface, a centerline of which is arranged in a direction parallel to the longitudinal direction of the light-emitting tube, is formed at the center of the light diverging section

(60) The strobe device described in one of items 54–59, characterized in that a peripheral section of the light diverging section in the optical panel is formed as a flat surface.

(61) The strobe device described in one of items 54–59, characterized in that a peripheral section of the light diverging section in the optical panel is formed as either a Fresnel surface or a row of prisms, which is parallel to the longitudinal direction of the light-emitting tube.

(62) The strobe device described in one of items 54–59, characterized in that a peripheral section of the light diverging section in the optical panel is formed as a concave cylindrical lens surface, a centerline of which is arranged in a direction parallel to the longitudinal direction of the light-emitting tube.

(63) The strobe device described in one of items 54–62, characterized in that the light diverging section of the optical panel is arranged at the surface faced to the light-emitting tube.

(64) The strobe device described in one of items 54–63, characterized in that, when assuming an imaginary surface which is orthogonal to the longitudinal direction of the light-emitting tube, a tilted-surface having an area being more than ½ of the inner sidewall area of the reflector, located opposite the imaginary surface, inclines at an angle being more than 40° with respect to the imaginary surface.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

The embodiment of the present invention will be detailed in the following.

Figure 7:
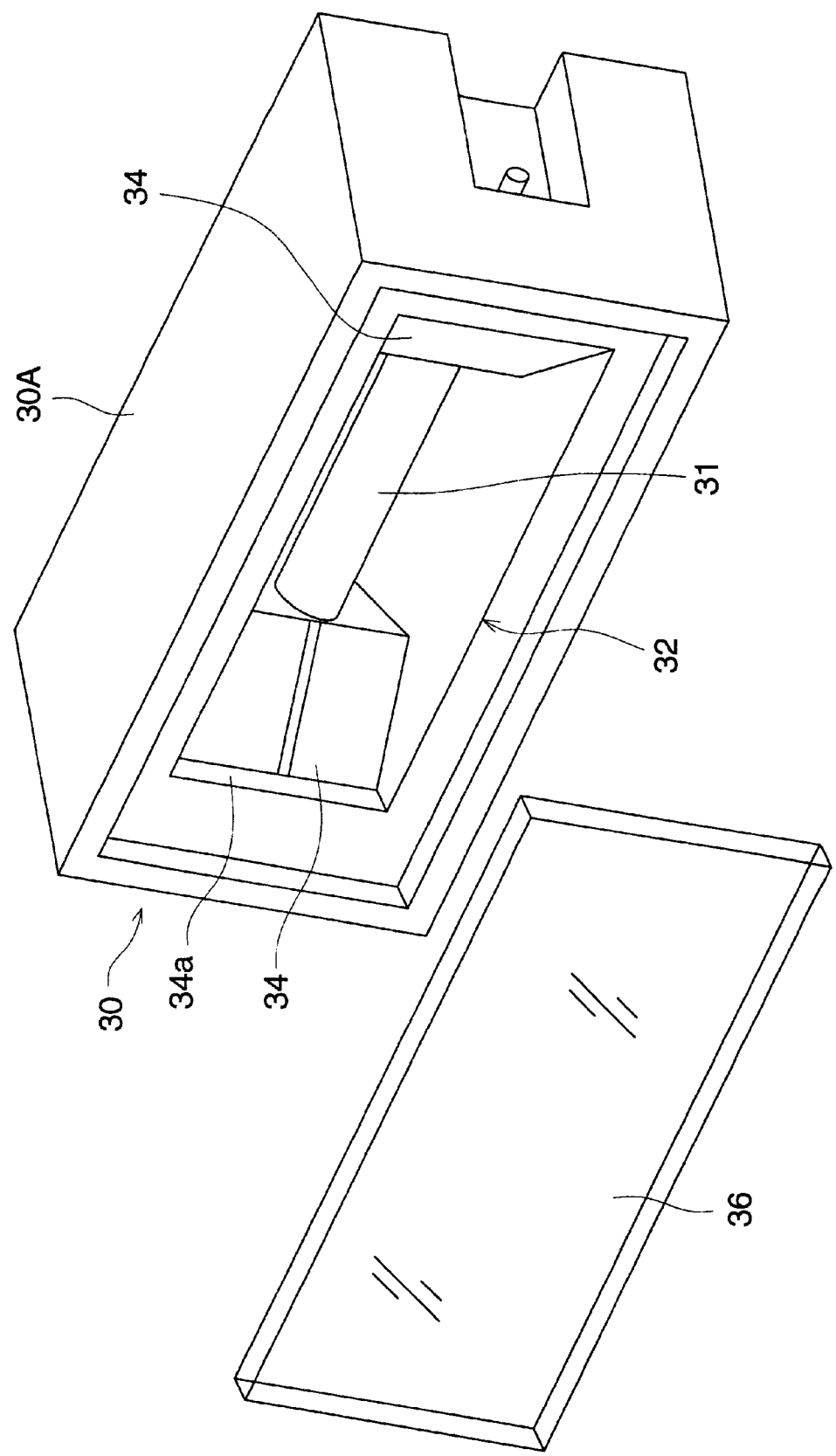
FIG. 7 shows an example of an outline structure of the strobe device, embodied in the present invention.
Figure 8:
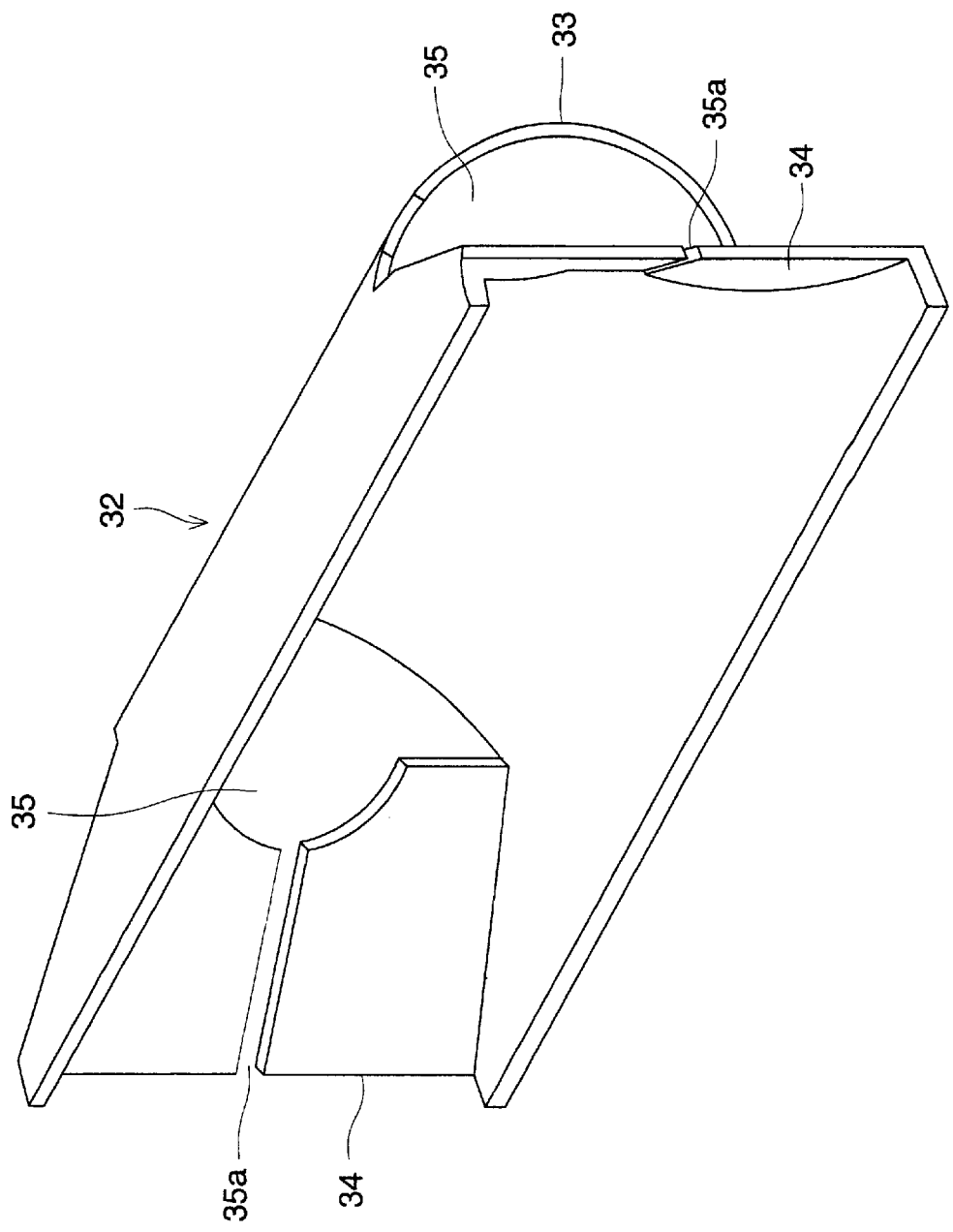
FIG. 8 shows a perspective view of the reflector incorporated in the strobe device, embodied in the present invention.

FIG. 7 shows an example of an outline structure of strobe device 30, embodied in the present invention, and FIG. 8 shows a perspective view of reflector 32 incorporated in strobe device 30.

Strobe device 30 comprises casing 30A with an opening in its front, in which light-emitting tube 31 and reflector 32 are inserted and held.

Reflector 32 is integrally formed with concave reflection surface 33 to reflect the strobe light, emitted from light-emitting tube 31, in a vertical direction, and side reflection surfaces 34 with slit grooves 35a to reflect the strobe light in the side directions.

Further, inserting holes 35, in which light-emitting tube 31 is inserted and held, is formed at both sides of a deepest portion of concave reflection surface 33.

As shown in FIG. 7, reflector 32 is mounted in casing 30A in a manner such that reflector 32 holds light-emitting tube 31 by gripping it with the tightening action of slit grooves 35a of side reflection surfaces 34.

Incidentally, instead of forming side reflection surfaces 34 as a flat surface, it is also applicable to incline side reflection surfaces 34 in a manner such that upper and lower sections of them protrude forward in reference to slit grooves 35a. In such structure, it is possible to effectively converge the light in the vertical direction by means of side reflection surfaces 34.

Figure 9:
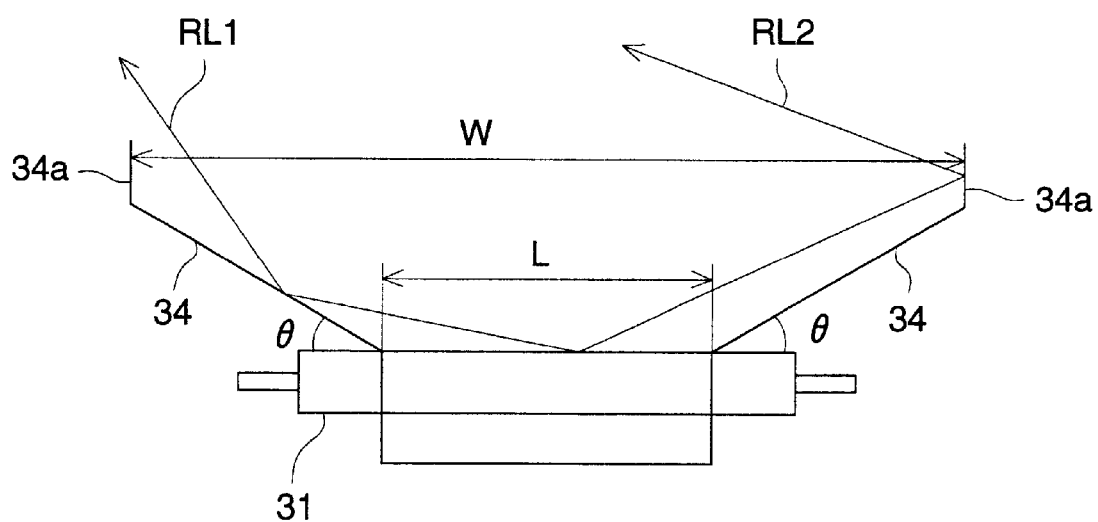
FIG. 9 shows an explanatory illustration, illustrating the light-emitting tube and the reflector, embodied in the present invention.

As shown in FIG. 9, it is desirable that sub-reflection surface 34a is formed at the front end of side reflection surfaces 34 in a direction perpendicular or substantially perpendicular to the longitudinal direction of light-emitting tube 31. In front of reflector 32 of casing 30, strobe panel 36, being an optical panel, is mounted.

Next, a method for measuring the amount of strobe light emitted from the strobe device will be detailed in the following, referring to FIG. 2.

Figure 1:
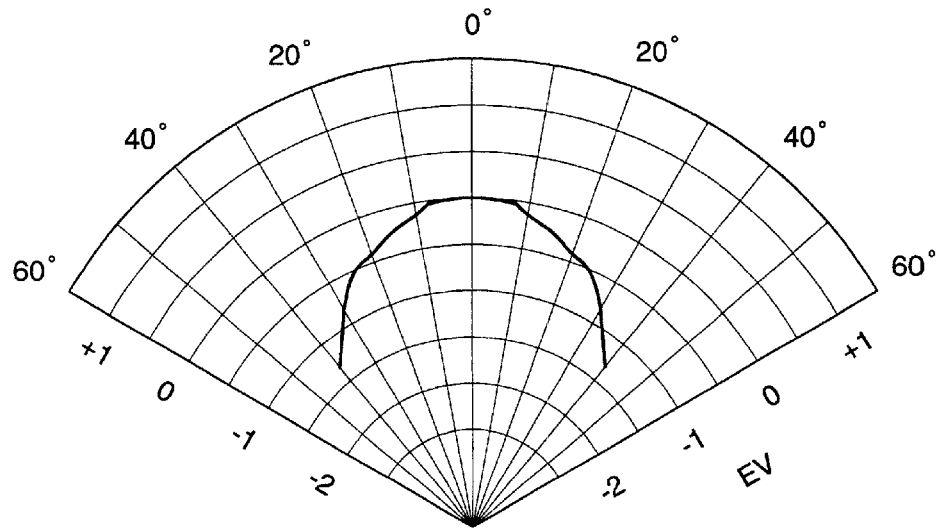
FIG. 1 shows distribution characteristics of the luminous intensity for a conventional strobe device.
Figure 2:
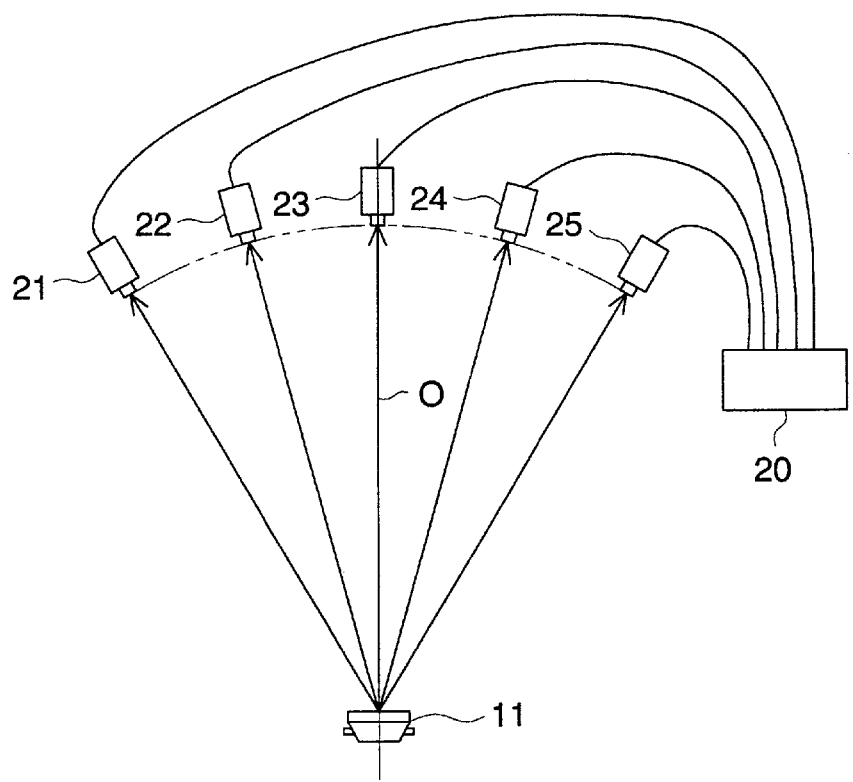
FIG. 2 shows an arrangement of a plurality of photosensors for measuring an amount of strobe light emitted from the strobe device.

In FIG. 2, numeral 11 indicates a light-emitting section of the strobe device, which is employed for a camera or a lens-fitted film unit, and from which strobe light is emitted. A plurality of photo-sensors 21, 22, 23, 24, 25 are arranged at positions, each of which is apart from light-emitting section 11 at a predetermined constant distance, namely on the same arc locus from the central point of light-emitting section, and are coupled to flash-meter 20. In this configuration, when strobe light is emitted from light-emitting section 11, strobe light enters each of photo-sensors 21, 22, 23, 24, 25, enabling each sensor to obtain the distribution characteristics of the luminous intensity shown in FIG. 1 by means of flash-meter 20.

Incidentally, the angle between photo-sensor 21 and photo-sensor 25 coincides with the viewing angle of the photographic lens employed for the lens-fitted film unit. The greater the number of the photo-sensors, the better the accuracy of the distribution characteristics of the luminous intensity, which can be obtained.

It is also applicable that only photo-sensor 23 be arranged on strobe light axis O, which is orthogonal with respect to the longitudinal direction of light-emitting tube 31 mounted in light-emitting section 11, and strobe lighting is activated every time when light-emitting section 11 is rotated and stopped at one of the suitable positions.

On the other hand, the viewing angle of the photographic lens can be derived from the following equation.

$$A = \tan^{-1}(L/2f)$$

Where: A; half of the viewing angle, L; length of the photographic image on the film, and f; focal length of the photographic lens.

Incidentally, lengths of the photographic image on 135 film and IX240 film are indicated in Table 1.

TABLE 1

|  | 135 Film | IX240 Film |
| --- | --- | --- |
| Horizontal length | 36 mm | 24 mm |
| Vertical length | 24 mm | 17 mm |
| Diagonal length | 43.3 mm | 29.4 mm |

Figure 3:
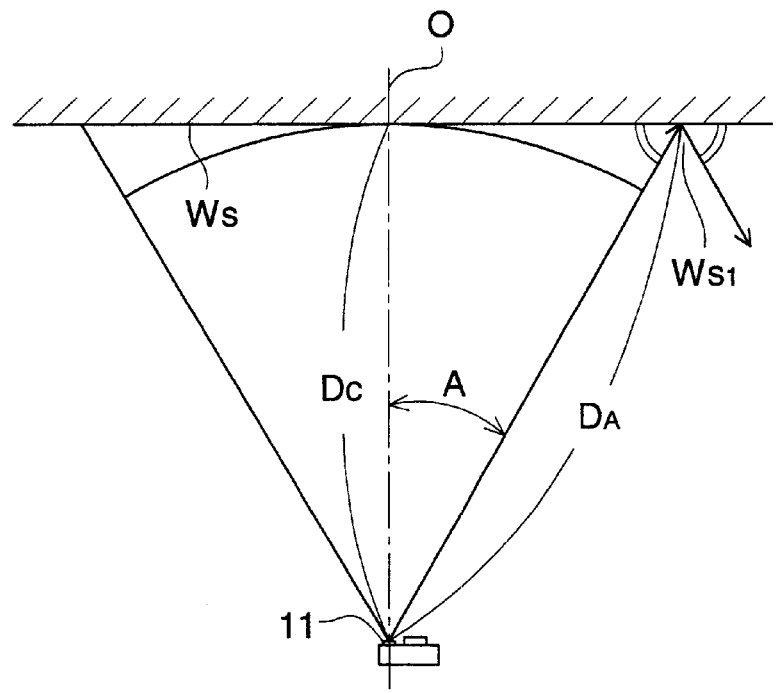
FIG. 3 shows a plane view of a subject of flat surface like a wall and a strobe device, indicating a relationship between them.

Now, it is assumed, when capturing image with strobe lighting, that the subject is a flat surface, like a wall, which is orthogonal with respect to strobe light axis O. Then, as shown in FIG. 3 where the distance along strobe light axis O from light-emitting section 11 to subject $W_S$ is defined as $D_C$, and the distance from light-emitting section 11 to subject $W_{S1}$, being spaced from strobe light axis O with half viewing angle A, is defined as $D_A$, distance $D_A$ is 1/cos(A) times of distance $D_C$. This means that the converted ratio of the light amount becomes the square of 1/cos(A), and then, the amount of returned light decreases at the rate of further square of it, when considering that strobe light goes back and forth by being reflected on subject $W_S$. Namely, the light-decreasing ratio Q can be expressed by the following equation.

$$Q = (\cos(A))^4$$

For instance, assuming that focal length f of a photographic lens is 30 mm in a camera using 135 film, half viewing angle A in the diagonal direction becomes 35.80. Therefore, only 43.3% of the emitted light amount returns to the camera at four corners in the diagonal direction.

Further, assuming that focal length f of a photographic lens is 17 mm, half viewing angle A in a diagonal direction becomes 48°. Therefore, only 20% of the emitted light amount returns to the camera at four corners in the diagonal direction.

Further, since the light emitted from strobe device 30 enters and reflects onto subject $W_S$, having a smooth and flat surface, at the same angles with respect to the normal line, due to the low of reflection, the amount of light returned along distance $D_A$ would further decrease, compared to the amount of light returned along distance $D_C$ of strobe light axis O, through which emitted light and reflected light travel on the same optical path. Namely, when the emitting angle of the strobe light with respect to strobe light axis O is defined as K, the larger the emitting angle K, the less the amount of light returning to the camera.

Further, the amount of periphery light reaching the film also decreases, due to the low of cosine to the fourth power in the photographic lens.

Owing to the abovementioned factors, the decrease of periphery light projected on the film is inevitable in the distribution characteristics of the luminous intensity shown in FIG. 1, even if the amount of periphery light is equivalent to that at the center position along strobe light axis O. This tendency will become more marked when employing a wide-angle lens having an especially large angle of view.

To overcome the abovementioned drawbacks, the present inventors are proposing a novel strobe device, which emits a maximum intensity of strobe light in the direction different from the direction of strobe light axis O. Incidentally, the term of the "strobe light axis" is defined as an axis of the center of the strobe light, and desirably defined as a line perpendicular to the optical panel at the center of the optical panel.

According to the present invention, it becomes possible to obtain a sufficient intensity of peripheral light by compensating for the luminous intensity at the predetermined angle, which is apt to decrease due to the adverse-factors mentioned above. This can be expressed by the following equation.

$Q_K$=(extinction amount of distance difference)+(extinction amount of incident and reflection angle)+(extinction amount of lens periphery)+$Q_C$ where: $Q_K$; the luminous intensity at angle $K°$ with respect to strobe light axis O, $Q_C$; the luminous intensity at the center along strobe light axis O.

Incidentally, the term of (extinction amount of lens periphery) should be excluded from the above equation, since this problem always happens even when strobe lighting is not used. Therefore, the above equation can be converted to the following equation.

$Q_K$=(extinction amount of distance difference)+(extinction amount of incident and reflection angle)+$Q_C$ Then, when an image capturing with strobe lighting is conducted, it becomes possible to obtain a photograph being equivalent to that captured in daylight without using strobe device.

Further, since it is a practically rare case that a flat subject has also a smooth surface, influence of the term (extinction amount of distance difference) is virtually greater than influence of the term (extinction amount of incident and reflection angle).

As a result of versatile experiments based on the above equation, the present inventors have reached the conclusion that excellent photographs can be obtained, in which peripheral extinction of light is by far the lowest level, compared to that of conventional photographs, when the following equation is fulfilled.

$[4\times\{(\cos(K_P))^{-4}-1\}\times Q_C]+Q_C \geq Q_{KP} \geq [0.1\times\{(\cos(K_P))^{-4}-1\}\times Q_C]+Q_C$ where: $K_P$; illumination angle for maximum luminous intensity with reference to strobe light axis O, $Q_{KP}$; maximum luminous intensity.

It is more desirable that the following equation is fulfilled.

Figure 4:
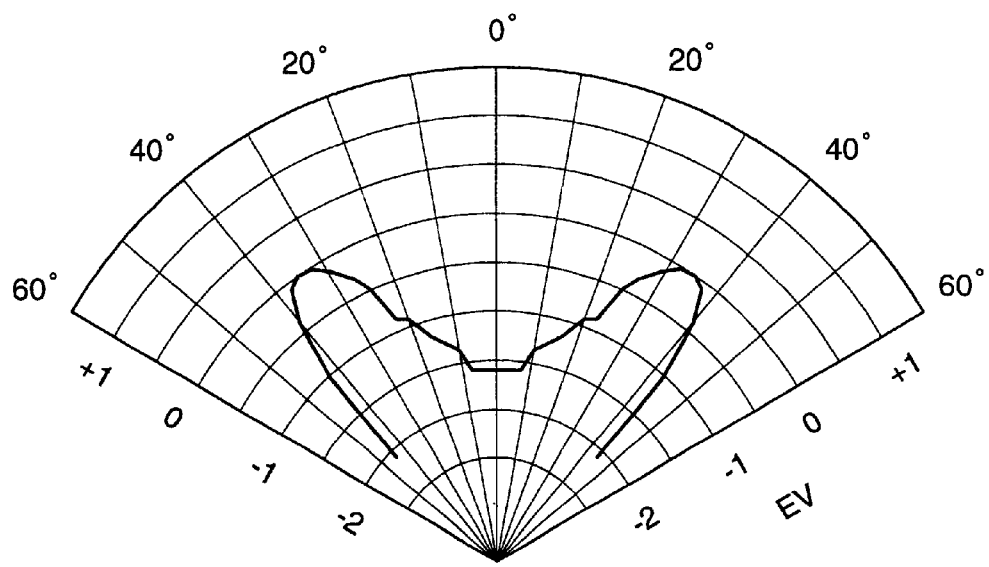
FIG. 4 shows distribution characteristics of the luminous intensity for the strobe device, embodied in the present invention.

$[2\times\{(\cos(K_P))^{-4}-1\}\times Q_C]+Q_C \geq Q_{KP} \geq [0.1\times\{(\cos(K_P))^{-4}-1\}\times Q_C]+Q_C$ Incidentally, the luminous intensity gradually decreases in a region located at outer side of illumination angle $K_P$ for maximum luminous intensity. Accordingly, as shown in FIG. 4, it is desirable that illumination angle $K_P$ for maximum luminous intensity is set at an angle being inner side of the viewing angle (half viewing angle A is 40° in FIG. 4) to reduce the ineffectual amount of light emitted beyond the viewing angle, namely, out of the photographed image frame.

Figure 34:
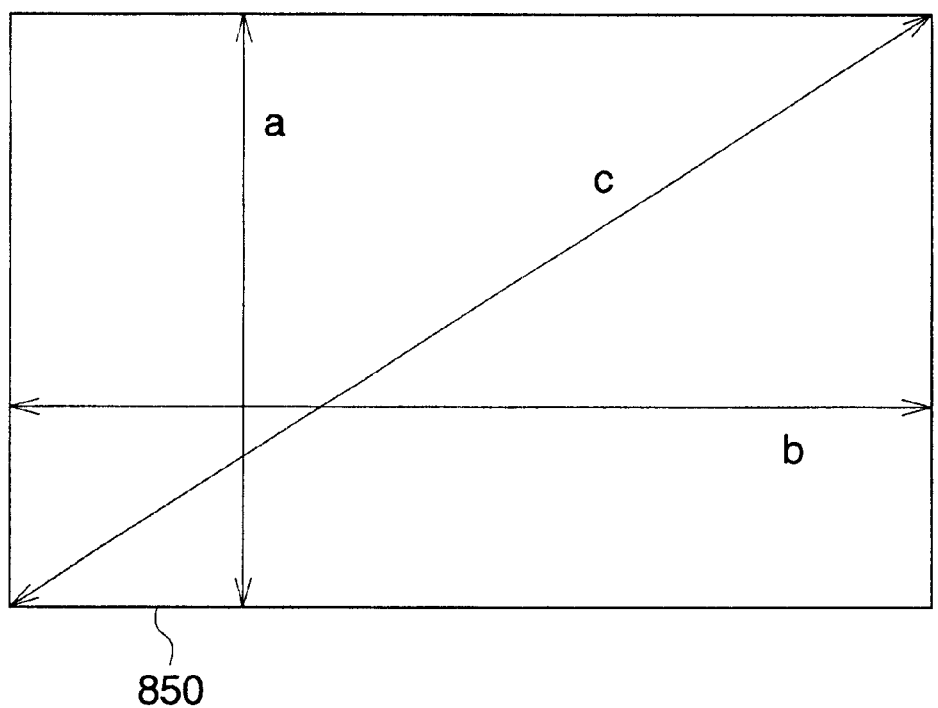

Further, the description of "set at an angle being inner side of viewing angle" is to set at an angle being more inner side than the viewing angle in a direction of at least one of the long side, the short side and the diagonal of the photographed image frame (desirably, the long side of it), which is formed on the image recording material by the photographic lens of the image capturing apparatus employing the strobe device. It is more desirable that illumination angle $K_P$ for maximum luminous intensity is set at an angle being more inner side than the viewing angles at all directions. Incidentally, numeral 850, shown in FIG. 34, indicates a photographed image frame. In addition, symbols "a", "b", "c", shown in FIG. 34, indicate each of directions of the long side, the short side and the diagonal of the photographed image frame, respectively.

As a result of versatile experiments further conducted, the present inventors have reached the conclusion that the periphery portion is illuminated brightly and the ineffectual amount of light can be reduced, when the following equation is fulfilled.

$(4/3)\times A \geq K_P \geq (1/5)\times A$ where: $K_P$ [degree]; illumination angle for maximum luminous intensity with reference to strobe light axis O, A [degree]; half viewing angle of photographic lens.

Incidentally, it is practically possible to limit the viewing angle within a direction of the long side of the photographed image frame. In this case, the above equation is converted to the following equation.

$(4/3)\times A_L \geq K_P \geq (1/5)\times A_L$ where: $A_L$; half viewing angle of photographic lens in a direction of the long side of the photographed image frame.

Further, it is effective to employ the following equation instead of the above equation.

$(9/10)\times A \geq K_P \geq (1/5)\times A.$

Furthermore, it becomes possible to obtain photographs, in which peripheral extinctions of images are reduced far less than that of conventional photographs, by structuring an image capturing apparatus so as to fulfill the following equation within the range of angles specified by $(9/10)\times A \geq K_P \geq (1/2)\times A$, with respect to strobe light axis O.

$[4\times\{(\cos(K_P))^{-4}-1\}\times Q_C]+Q_C \geq Q_{KP} \geq [0.1\times\{(\cos(K_P))^{-4}-1\}\times Q_C]+Q_C$ Still furthermore, it is more desirable to convert the above equation to the following equation.

$$[2\times\{(\cos(K_P))^{-4}-1\}\times Q_C]+Q_C \geq Q_{KP} \geq [0.1\times\{(\cos(K_P))^{-4}-1\}\times Q_C]+Q_C.$$

Figure 5:
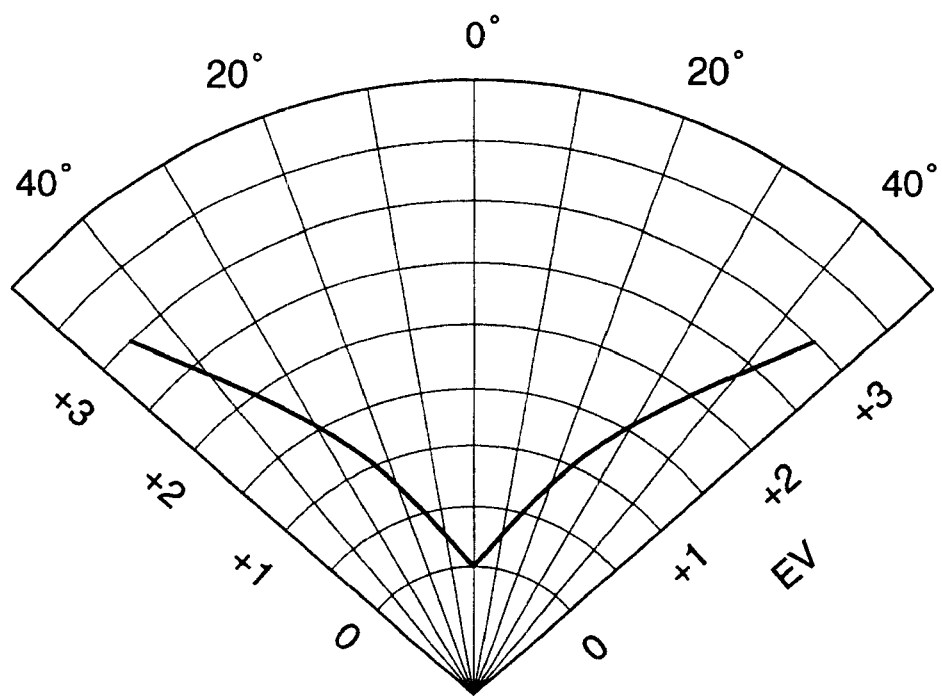
FIG. 5 shows another distribution characteristics of the luminous intensity for the strobe device, embodied in the present invention.
Figure 6A:
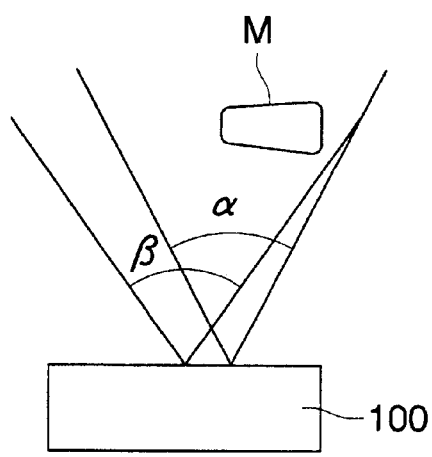
FIG. 6 shows an explanatory illustration, indicating relationship between a viewing angle of conventional photographic lens and an illumination angle of the strobe light emitted from the strobe device.
Figure 6B:
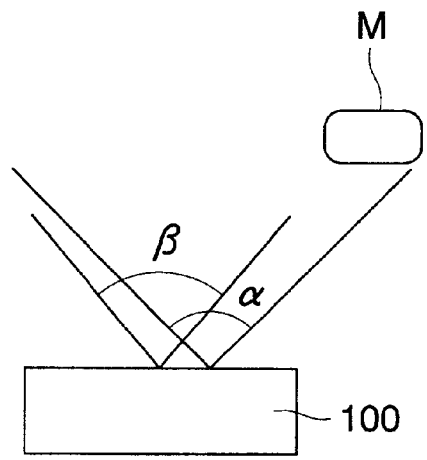

Incidentally, although it would differ from the above description, it is also applicable to intentionally set illumination angle $K_P$ for maximum luminous intensity being larger than the angle of view, when the strobe device has sufficient margin in total amount of illumination power. As a result, the most intense strobe light is emitted toward the outer side of the photographed image frame and is reflected from the ceiling and walls when image capturing is conducted indoors, resulting in a bounce photographic effect, so to speak. Then, it is possible to capture a photograph with more natural feeling, softening the shadows of the subject. FIG. 5 shows distribution characteristics of the luminous intensity in the case mentioned above, where the half viewing angle is 40°.

Next, a desirable configuration, to obtain distribution characteristics of the luminous intensity in the strobe device embodied in the present invention, will be described.

In the following, a desirable structure of the reflector will be detailed.

Referring to FIG. 9, a desirable structure of side reflection surfaces 34 in the strobe device, and a state of reflecting light emitted from light-emitting tube 31 will be detailed.

FIG. 9 shows light-emitting tube 31 and reflector 32 as a line drawing. Angle θ of side reflection surfaces 34 with the longitudinal direction of light-emitting tube 31 is set at such an angle that light ray RL1 emitted from light-emitting tube 31 is reflected on side reflection surfaces 34 so as to be directed toward a direction of being apart from strobe light axis O (or a direction (a horizontal width direction) of being apart from both sides of light-emitting tube 31 in front of it), instead of toward a direction of crossing strobe light axis O located at the center of light-emitting tube 31.

In addition, length L, which is the effective illuminating length of light-emitting tube 31 (a part of illuminating portion exposed in concave reflection surface 33 of reflector 32), and length W, which is the length of a longitudinal part of strobe panel 36 being transparent for the strobe light, are set in the following relationship.

$$1.5 \leq W/L \leq 2.0, \text{ or desirably, } 1.7 \leq W/L \leq 1.9$$

According to the strobe device mentioned above, since angle θ of side reflection surfaces 34 is set at such an angle that light ray RL1 emitted from light-emitting tube 31 is reflected on side reflection surfaces 34 so as to be directed toward a direction (a horizontal width direction) of being apart from both sides of light-emitting tube 31 in front of it, it becomes possible to illuminate a wider angle region, compared to conventional strobe devices. Accordingly, the strobe device, embodied in the present invention, can sufficiently cope with widening the viewing angle of the photographic lens, though it is not shown in the drawing. In addition, it is also possible to shorten the width of reflector 32 by reflecting light ray RL2 emitted from light-emitting tube 31, or light ray RL1 reflected on side reflection surfaces 34, so as to be directed toward a direction of being apart from both sides of light-emitting tube 31 in front of it, toward a direction of the subject by means of sub-reflection surface 34a, which is formed at front end of reflector 32. It is also possible to suppress unnecessary diffusions of light, as well.

Further, since it is possible to illuminate the subject with a wide range of a light, emitted from light-emitting tube 31, or a light reflected from side reflection surfaces 34, based on the abovementioned relationship of $1.5 \leq W/L \leq 2.0$, or desirably, $1.7 \leq W/L \leq 1.9$, the strobe device, embodied in the present invention, can sufficiently cope with the trend of widening the viewing angle of the photographic lens.

Further, it is also possible to widen the viewing angle of the photographic lens and to minimize the dimension of the strobe device by setting W/L=2.0, or desirably, $1.7=W/L$. It is desirable that the distribution characteristics of the luminous intensity in the longitudinal direction of light-emitting tube 31 (desirably, in the short side direction of the photographed image frame) can be improved in the structure mentioned above.

Next, another example of a desirable structure of the reflection surface will be detailed. It is desirable that the distribution characteristics of the luminous intensity in a direction perpendicular to the longitudinal direction of light-emitting tube 31 (desirably, along the long side direction of the photographed-image frame) can be improved in the following structure.

In a strobe device having a cylindrical light-emitting tube 31 and a concave reflection surface 33, it is desirable that the inner cross-sectional shape of concave reflection surface 33, in the direction perpendicular to the longitudinal direction of light-emitting tube 31, fulfills the following conditional equations.

$$3.0U < W1 < 5.2U \tag{1}$$

$$1.2U < W2 < 3.5U \tag{2}$$

$$2U < D < 5U \tag{3}$$

where: W1; width at the front end of concave reflection surface 33, W2; width of concave reflection surface 33 at the center axis of light-emitting tube 31, D; distance from the front end of concave reflection surface 33 to the center axis of light-emitting tube 31, and U; distance from the center axis of light-emitting tube 31 to the rear end of concave reflection surface 33.

In addition, the abovementioned object can also be attained more desirably by a strobe device, which fulfills the following conditional equations.

$$3.0U < W1 < 4.7U \tag{4}$$

$$1.2U < W2 < 3.2U \tag{5}$$

$$2U < D < 5U \tag{6}$$

Further, the abovementioned object also can be attained still more desirably by a strobe device, which fulfills the following conditional equations.

$$3.0U < W1 < 4.0U \tag{7}$$

$$1.2U < W2 < 3.0U \tag{8}$$

$$2.5U < D < 4U \tag{9}$$

Further, in regard to the cross-sectional shape of both sides of concave reflection surface 33 at the center of strobe light axis O, when the front end point of concave reflection surface 33, the intersection of the line perpendicular to strobe light axis O at the center axis of light-emitting tube 31 and concave reflection surface 33, and the rear end point of concave reflection surface 33 on strobe light axis O, are defined as P, Q and V, respectively, all points residing on concave reflection surface 33 between points P and Q, are located opposite the center axis of light-emitting tube 31 with respect to the line P-Q, while all points, residing on concave reflection surface 33 between points Q and V, are located opposite the center axis of light-emitting tube 31 with respect to the line Q-V, and it is desirable that the following equations are fulfilled.

$$0.05 < \Delta 1/U < 0.4 \quad (10)$$

$$0.07 < \Delta 2/U < 0.5 \quad (11)$$

where: Δ1; maximum distance between a point, residing on concave reflection surface 33 between point P and point Q, and the line P-Q, Δ2; maximum distance between a point, residing on concave reflection surface 33 between point Q and point V, and the line Q-V.

Further, it is more desirable to fulfill the following conditional equations.

$$0.1 < \Delta 1/U < 0.3 \quad (12)$$

$$0.12 < \Delta 2/U < 0.3 \quad (13)$$

In addition, it is desirable that light-emitting tube 31 is apart from concave reflection surface 33.

Further, it is desirable to fulfill the following conditional equation, where the outer diameter of light-emitting tube 31 is defined as T.

$$0.5 < T/U < 1.5 \quad (14)$$

To obtain a strobe device, having a large illuminating angle, which emits a greater amount of light in the peripheral portion rather than the central portion, the direction of the strobe light, which is emitted from light-emitting tube 31 and reflected by reflector 32, is an important factor, and roughly speaking, there are two methods to obtain a large illuminating angle.

The first method is to reflect the strobe light so as not to cross strobe light axis O, while the second method is to reflect the strobe light so as to cross strobe light axis O. In the first method, according as light rays, being controllable by reflector 32, are increased, vertical width W1 at the front end of concave reflection surface 33 becomes excessively large. Then, there is a possibility that the dimension of strobe panel 36 (optical panel) mounted in front of reflector 32 also be excessively enlarged. In the second method, although vertical width W1 can be maintained at a small size, there is a possibility that the direction of reflected light would be changed by being reflected again from reflector 32. Therefore, to overcome the above, some ideas are required for forming the shape of concave reflection surface 33. For this purpose, the strobe device is configured so as to fulfill the conditional equations (1), (2), (3), in order to obtain a small-sized strobe device, but having a large illuminating angle.

When the strobe device fulfills the conditional equation (1), the light intensity at the peripheral portion desirably increases without decreasing the amount of light.

When the strobe device fulfills the conditional equation (2), the light intensity at the peripheral portions desirably increases without decreasing the amount of light.

When the strobe device fulfills the conditional equation (3), the light intensity at the peripheral portions can be desirably increased by means of small-sized concave reflection surface 33.

When the strobe device fulfills the conditional equations (4), (5), (6), the balance of the abovementioned factors, dimensions and the distribution characteristics of the luminous intensity are desirably improved.

When the strobe device fulfills the conditional equations (7), (8), (9), the balance of the abovementioned factors, dimensions and the distribution characteristics of the luminous intensity are still further desirably improved.

When the strobe device fulfills the conditional equations (10), (11), a light beam reflected by reflector 32 is substantially parallel and inclined with respect to strobe light axis O, resulting in an increase of the light intensity in the peripheral portions.

When the strobe device fulfills the conditional equations (12), (13), the light intensity at the peripheral portions increases, resulting in a desirable image capturing.

When the strobe device fulfills the conditional equation (14), the distribution characteristics of the luminous intensity can be desirably improved into good one.

Figure 10:
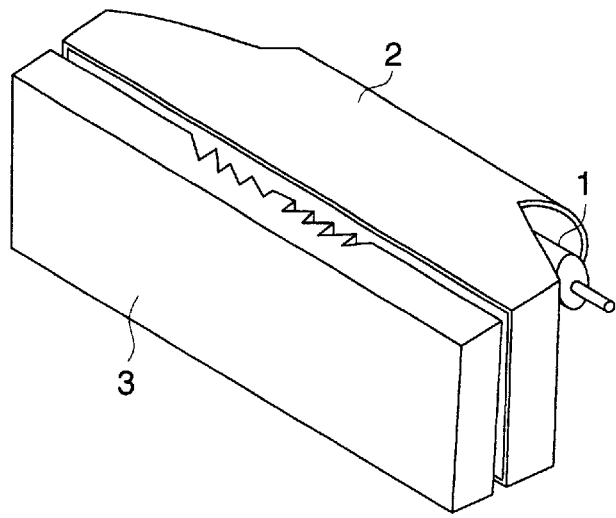
FIG. 10(A), FIG. 10(B) and FIG. 10(C) show a perspective view of the strobe light-emitting section, an upper view of the strobe light-emitting section and a side view of the strobe light-emitting section, respectively, embodied in the present invention.
Figure 10:
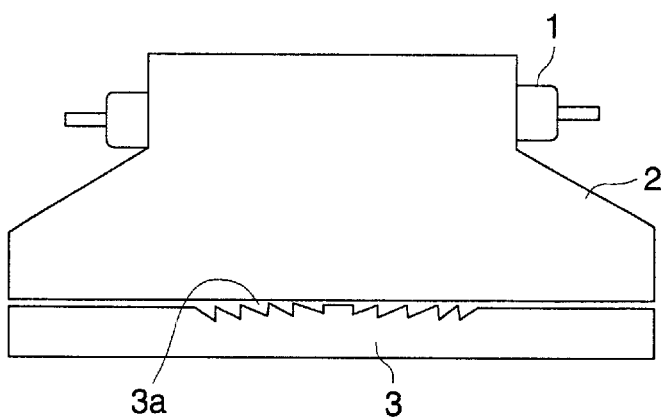
Figure 10:
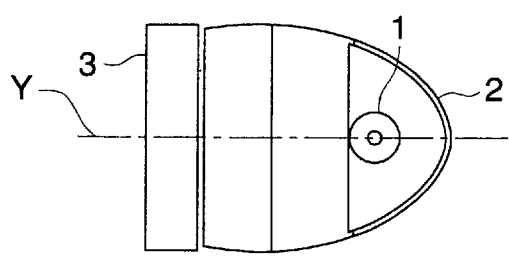

Referring to FIG. 10(A), FIG. 10(B) and FIG. 10(C), a strobe light-emitting section of another embodiment of the strobe device will be detailed in the following.

FIG. 10(A) shows a perspective view of the strobe light-emitting section, FIG. 10(B) shows an upper view of the strobe light-emitting section and FIG. 10(c) shows a side view of the strobe light-emitting section.

Numeral 1 indicates a light-emitting tube formed in a cylindrical shape to emit a strobe light. When a capacitor is charged by a strobe circuit (not shown in the drawings), a high-voltage is applied between the both electrodes of light-emitting tube 1. To emit the desired strobe light, a still higher voltage is applied to the trigger electrode by operating the shutter release button, so as to allow ionizes xenon atoms in light-emitting tube 1 to be excited by impinging with electrons isolating from the cathode, resulting in illumination of the strobe light.

Numeral 2 indicates a reflector, which converges a strobe light emitted from light-emitting tube 1 and reflects it toward the subject. The cross-sectional shape of the inner surface of reflector 2, in the direction orthogonal to the longitudinal direction of light-emitting tube 1, is formed in such a curve to be described later, while the cross-sectional shape, in the direction parallel to the longitudinal direction of light-emitting tube 1, is formed substantially in the straight line.

Numeral 3 indicates an optical panel, which covers the front of reflector 2 to protect it. In the inner surface of optical panel 3, a Fresnel lens 3a is formed in the direction orthogonal to the longitudinal direction of light-emitting tube 1.

In the configuration mentioned above, the inner shape of reflector 2 regulates the distribution characteristics of the luminous intensity of the strobe light, in the direction orthogonal to the longitudinal direction of light-emitting tube 1, which is not influenced by optical panel 3. While, Fresnel lens 3a of optical panel 3 regulates the distribution characteristics of the luminous intensity of the strobe light in the direction parallel to the longitudinal direction of light-emitting tube 1.

Incidentally, axis Y, which goes through the center of light-emitting tube 1 in a direction toward the front of the strobe device, is defined as the strobe light axis. In addition, it is desirable that reflector 2 is made of a metal, more desirably, a high-luminous aluminum, and it is also desirable that optical panel 3 is made of an acrylic resin.

A desirable example of a concave reflection panel in the strobe device, embodied in the present invention, will be described in the following.

Figure 11:
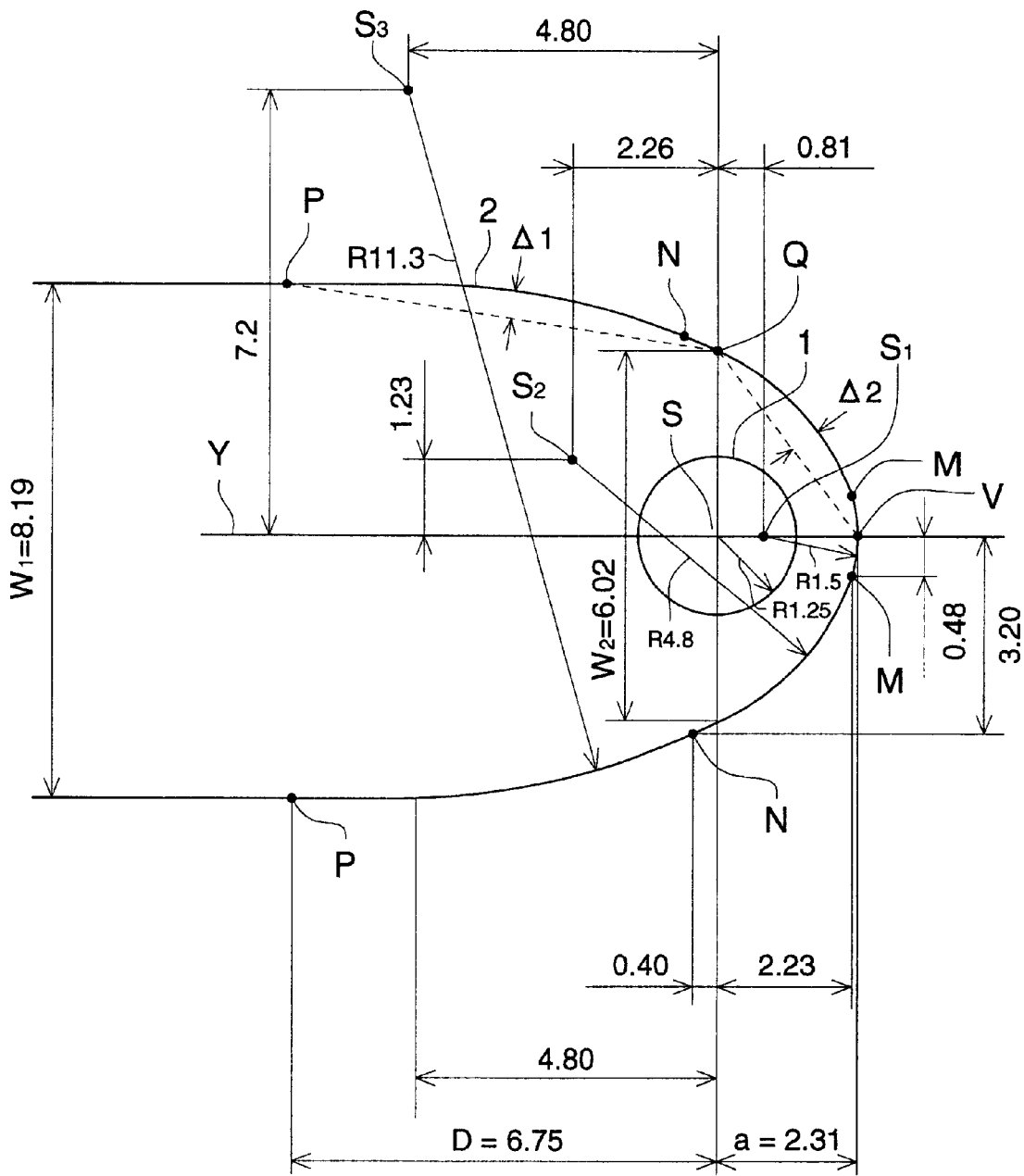
FIG. 11 shows a cross-sectional view of the reflector in the direction orthogonal to the longitudinal direction of the light-emitting tube.

FIG. 11 shows a cross-sectional view of reflector 2 in the direction orthogonal to the longitudinal direction of light-emitting tube 1.

As shown in FIG. 11, the cross-sectional shape of concave reflection surface 2a of reflector 2 is formed in vertical symmetry with respect to strobe light axis Y. Symbol W1 indicates the opening width at front end P of concave reflection surface 2a, symbol W2 indicates the width of concave reflection surface 2a at center axis S of light-emitting tube 1, symbol D indicates the distance from front end P to center axis S of light-emitting tube 1 and symbol U indicates the distance from center axis S of light-emitting tube 1 to rear end V of concave reflection surface 2a.

The cross-sectional shape of reflector 2 is formed by connecting three arcs. The arc centered from S1 is connected to the arc centered from S2 at point M, while the arc centered from S2 is connected to the arc centered from S3 at point N. The straight line, which goes through point P and is parallel to strobe light axis Y, is a tangent line of the arc centered from S3.

Further, when the intersection to the straight line, which goes through the center axis of light-emitting tube 1 and is perpendicular to strobe light axis Y, is defined as point Q, all points residing on concave reflection surface 2a between points P and Q, are located opposite the center axis S of light-emitting tube 1 with respect to the line P-Q, while all points residing on concave reflection surface 2a between points Q and V, are located opposite the center axis S of light-emitting tube 1 with respect to the line Q-V.

Now, each size, corresponding to each of symbols, is indicated as follow.

U=2.31
W1=8.19
W2=6.02
D=6.75
T=2.5

Further, values in the aforementioned conditional equations are indicated as follow.

W1/U=3.54
W2/U=2.61
D/U=2.92
T/U=1.08
Δ1/U=0.17
Δ2/U=0.22

Figure 12:
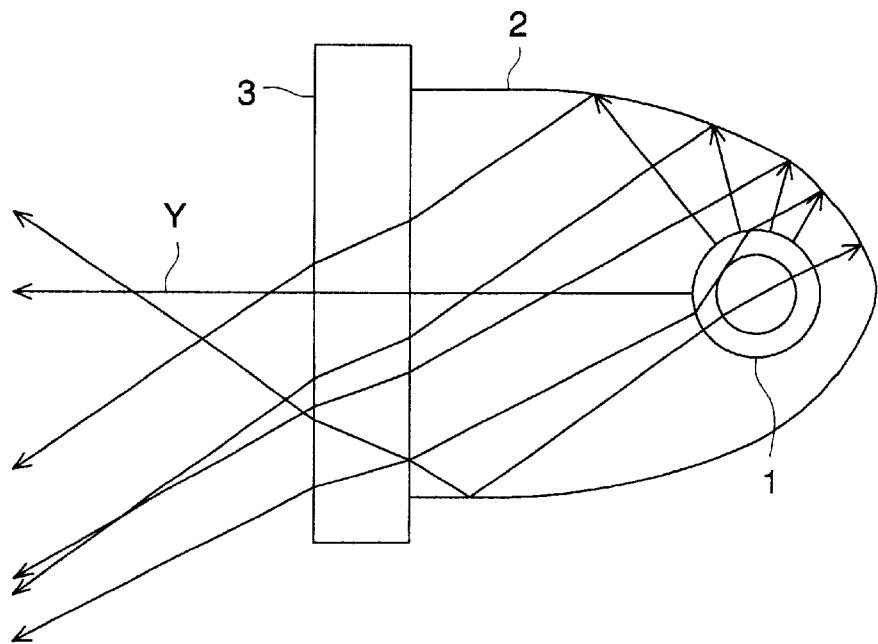
FIG. 12 shows paths of light rays in the exemplified embodiment.

FIG. 12 shows paths of light rays in the exemplified embodiment. Since light rays, which are emitted from light-emitting tube 1 and reflected by concave reflection surface 2a, cross the strobe light axis Y, substantially all of the light rays are emitted to outside along the direction required, instead of being reflected again by concave reflection surface 2a.

Figure 13:
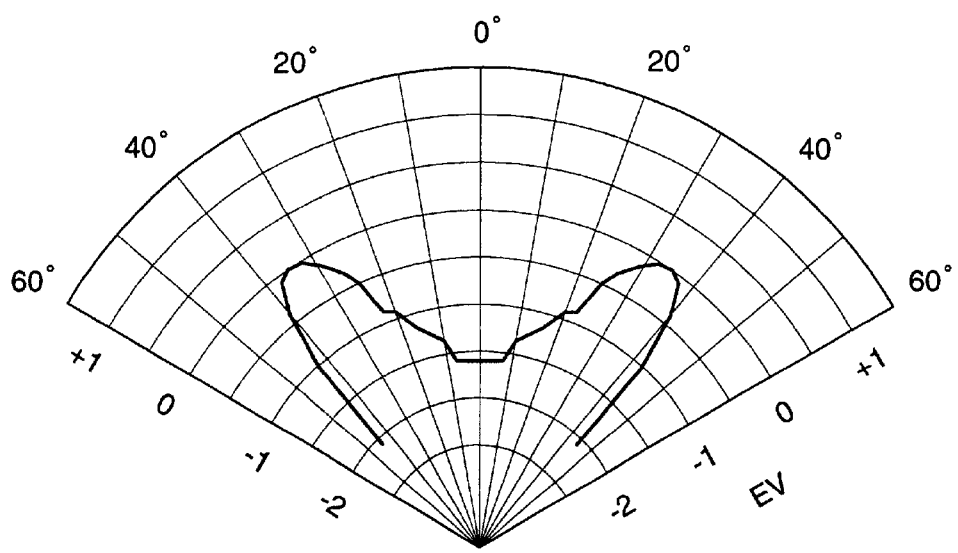
FIG. 13 shows distribution characteristics of the luminous intensity for the strobe device, embodied in the present invention, in a direction orthogonal to the longitudinal direction of the light-emitting tube.

In the exemplified embodiment, since both sides of strobe light axis Y are formed in such a shape as being substantially a parabola, which inclines inside at around 35° and has a focal point at center axis S of light-emitting tube 1, a substantially parallel light beam is emitted from center axis S and, as shown in FIG. 13, the maximum peak intensity of the light beam emerges in the direction inclined at 35° in both sides of the distribution characteristics of the luminous intensity. Incidentally, the half viewing angle, which is suitable for the photographic lens employed in this exemplified embodiment, is 40°.

Figure 14:
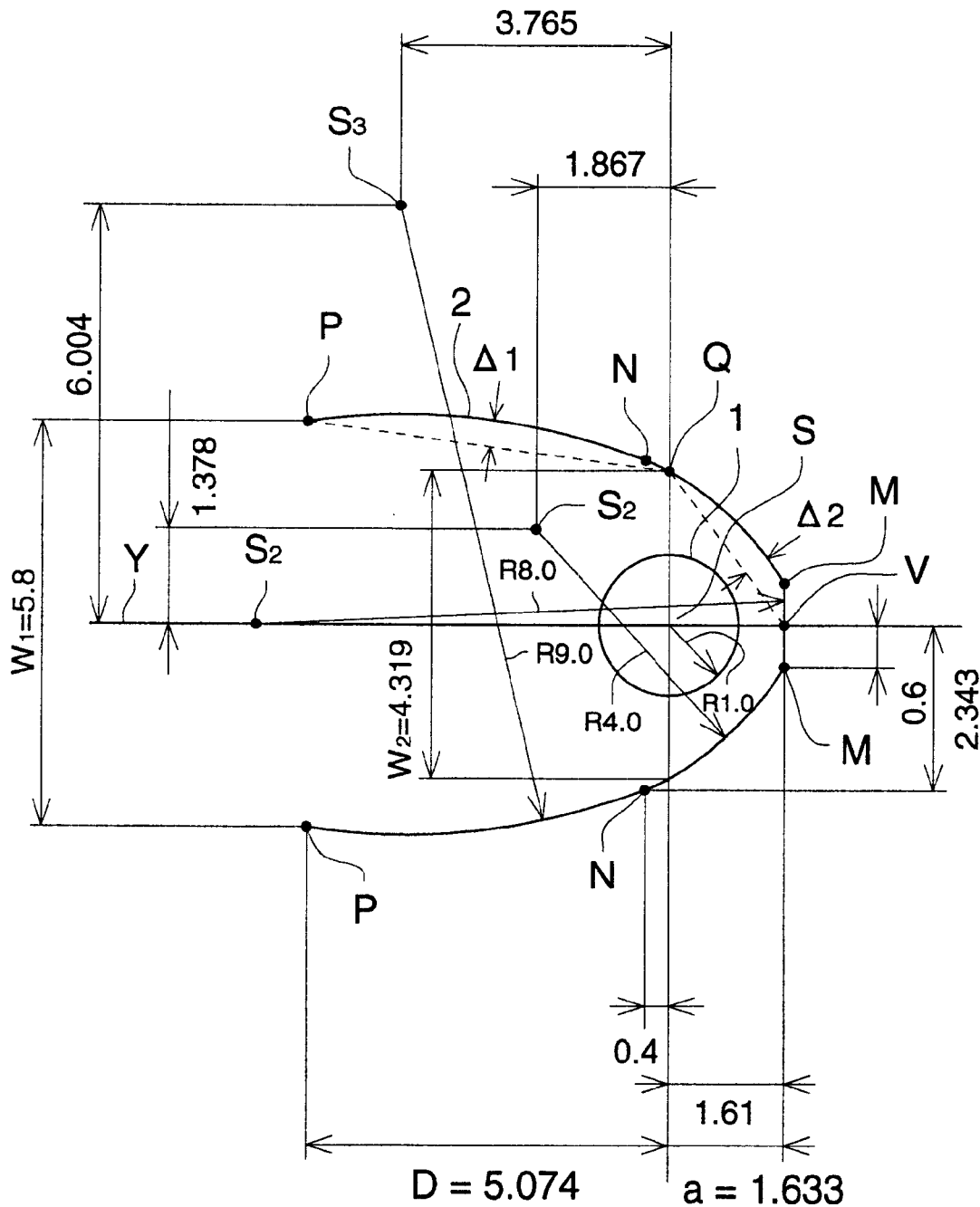
FIG. 14 shows a cross-sectional view of the concave reflection surface employed for another exemplified embodiment of the strobe device.

FIG. 14 shows a cross-sectional view of concave reflection surface 2a employed for another exemplified embodiment of the strobe device. Since the symbols attached to the cross-sectional shape are the same as those of the aforementioned embodiment, explanations for them will be omitted.

In this exemplified embodiment, the cross-sectional shape of reflector 2 is formed by again connecting three arcs, as in the aforementioned embodiment. The arc centered from S1 is connected to the arc centered from S2 at point M, while the arc centered from S2 is connected to the arc centered from S3 at point N and the arc centered from S3 is connected at point P.

Further, when the intersection to the straight line, which goes through the center axis of light-emitting tube 1 and is perpendicular to strobe light axis Y, is defined as point Q, all points residing on concave reflection surface 2a between points P and Q, are located opposite the center axis S of light-emitting tube 1 with respect to the line P-Q, while all points residing on concave reflection surface 2a between points Q and V, are located opposite the center axis S of light-emitting tube 1 with respect to the line Q-V.

Now, each size, corresponding to each of symbols, is indicated as follow.

U=1.633
W1=5.80
W2=4.319
D=5.074
T=2.0

Further, values in the aforementioned conditional equations are indicated as follow.

W1/U=3.55
W2/U=2.64
D/U=3.11
T/U=1.22
Δ1/U=0.24
Δ2/U=0.24

Figure 15:
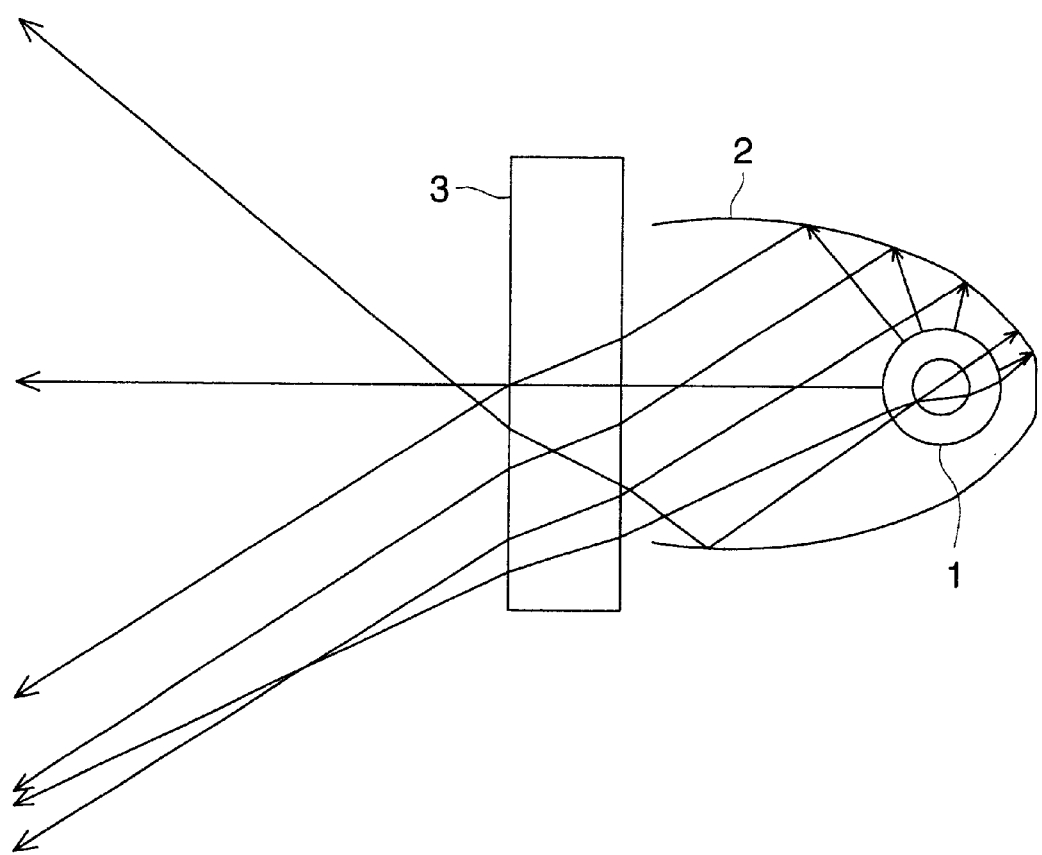
FIG. 15 shows paths of light rays in another exemplified embodiment.

FIG. 15 shows paths of light rays in this exemplified embodiment. In this example as well as the aforementioned example, since light rays reflected by concave reflection surface 2a, cross the strobe light axis Y, substantially all of the light rays are emitted to outside along the direction required, instead of reflected again by concave reflection surface 2a.

Figure 16:
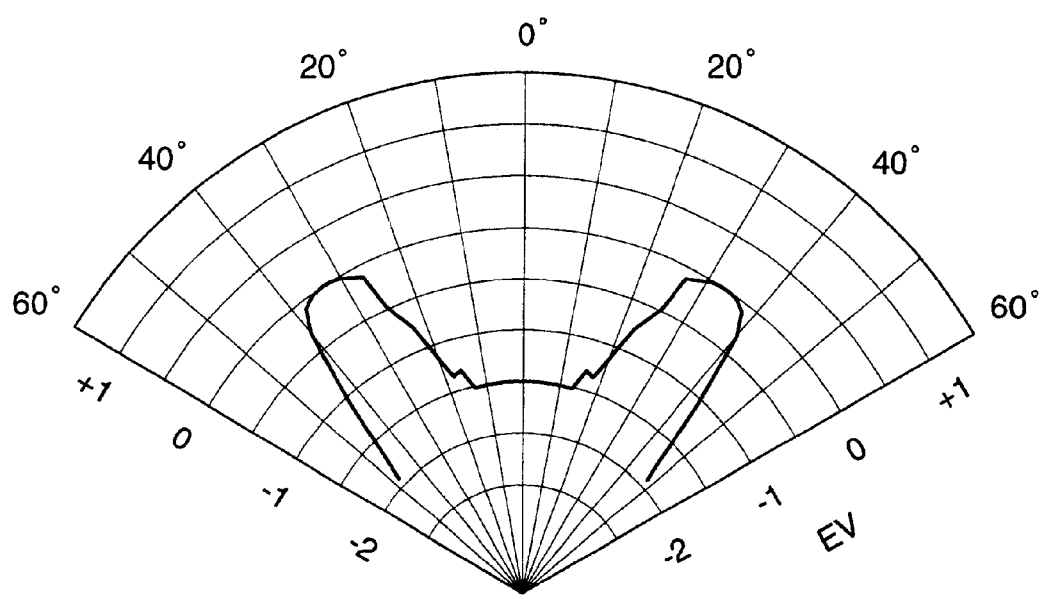
FIG. 16 shows distribution characteristics of the luminous intensity in another exemplified embodiment.

FIG. 16 shows distribution characteristics of the luminous intensity in this exemplified embodiment. Incidentally, the half viewing angle, which is suitable for the photographic lens employed in this exemplified embodiment, is 40°.

Figure 17:
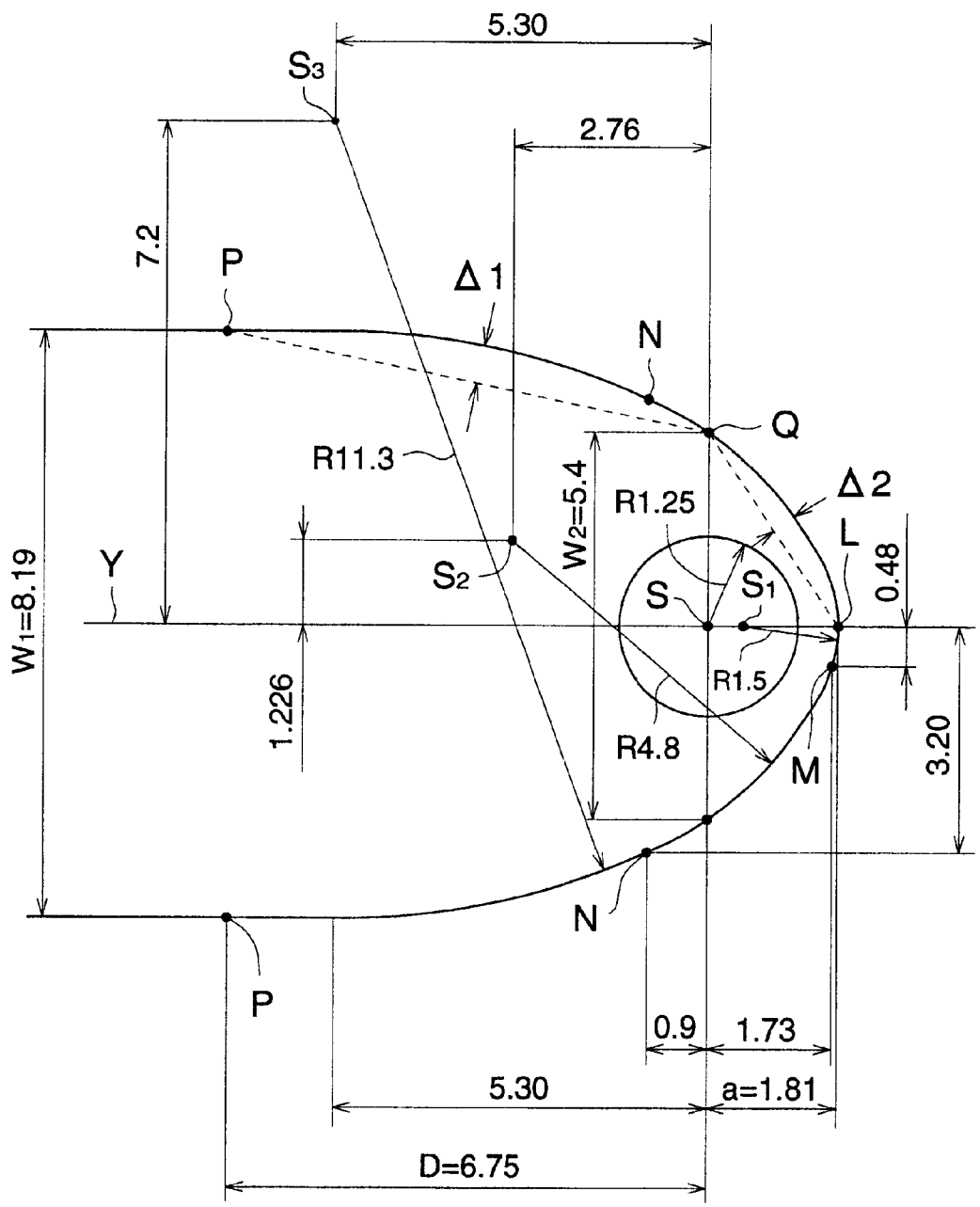
FIG. 17 shows a cross-sectional view of the concave reflection surface employed for still another exemplified embodiment of the strobe device.

FIG. 17 shows a cross-sectional view of concave reflection surface 2a employed for still another exemplified embodiment of the strobe device. Since the symbols attached to the cross-sectional shape are the same as those of the aforementioned embodiment, explanations for them will be omitted.

In this exemplified embodiment, the cross-sectional shape of concave reflection surface 2a is formed by connecting three arcs, as well. The arc centered from S1 is connected to the arc centered from S2 at point M, while the arc centered from S2 is connected to the arc centered from S3 at point N. The straight line, which goes through point P and is parallel to strobe light axis Y, is a tangent line of the arc centered from S3.

Further, when the intersection to the straight line, which goes through the center axis of light-emitting tube 1 and is perpendicular to strobe light axis Y, is defined as point Q, all points residing on concave reflection surface 2a between points P and Q, are located opposite the center axis S of light-emitting tube 1 with respect to the line P-Q, while all points residing on concave reflection surface 2a between points Q and V, are located opposite the center axis S of light-emitting tube 1 with respect to the line Q-V.

Now, each size, corresponding to each of symbols, is indicated as follow.

U=1.81
W1=8.19

W2=5.40
D=6.75
T=2.5

Further, values in the aforementioned conditional equations are indicated as follow.

W1/U=4.52
W2/U=2.98
D/U=3.73
T/U=1.38
Δ1/U=0.304
Δ2/U=0.171

FIG. 16 shows distribution characteristics of the luminous intensity in this exemplified embodiment.

Figure 18:
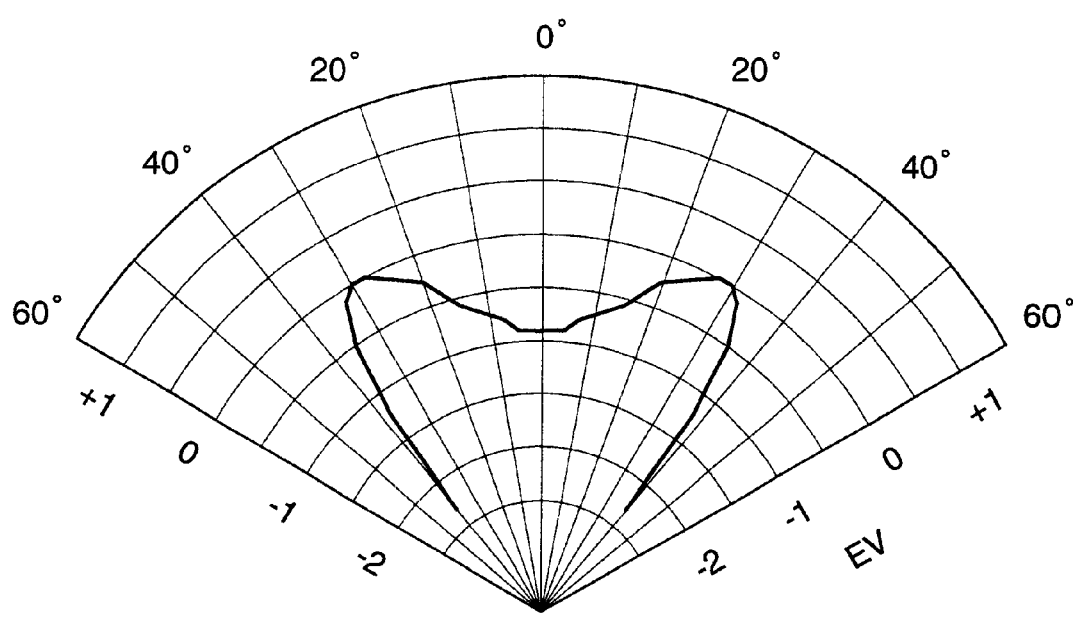
FIG. 18 shows distribution characteristics of the luminous intensity in still another exemplified embodiment.

As described in the above, in the distribution characteristics of luminous intensity shown in FIG. 13, FIG. 16 and FIG. 18, which are plotted in a direction orthogonal to the longitudinal direction of the light-emitting tube, the luminous intensity is desirably distributed within an angle of around 40° at each of both sides and the luminous intensity at around 35° is larger than that at the center portion. As a result, more uniform luminous intensity can be obtained even for a subject such as a flat surface perpendicular to the strobe light axis. In addition, it is also possible to brightly illuminate peripheral backgrounds locating farther than the main subject. Accordingly, it becomes possible to obtain a natural photograph with the feeling of liveliness, in which backgrounds are brightly photographed. Further, since it is possible to distribute the luminous intensity over a wide-angle range, it becomes possible to provide a strobe device, which desirably suites wide-angle lenses.

On the other hand, in the configuration of the strobe device in which the luminous intensity increases at peripheral region according as the illuminating angle becomes larger than that at the center portion, it is possible to Diverge the strobe light beam by means of optical panel 3. A desirable embodiment of the optical panel will be detailed in the following.

Figure 19:
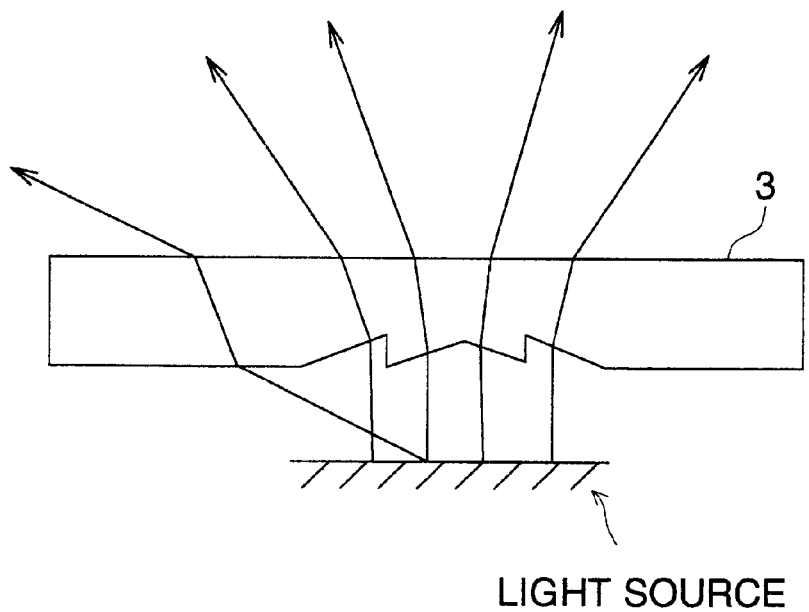
FIG. 19 shows an explanatory illustration of the light diverging effect.

For example, as shown in FIG. 19, light rays entering into the central area of optical panel 3 diverge from it by means of the light diverging section, which is formed in the center of optical panel 3 along the longitudinal direction of the light-emitting tube. Incidentally, since light rays enter into the peripheral area of optical panel 3 inherently at a large angle of incident, the light diverging section is not necessary in the peripheral area of it.

Figure 20:
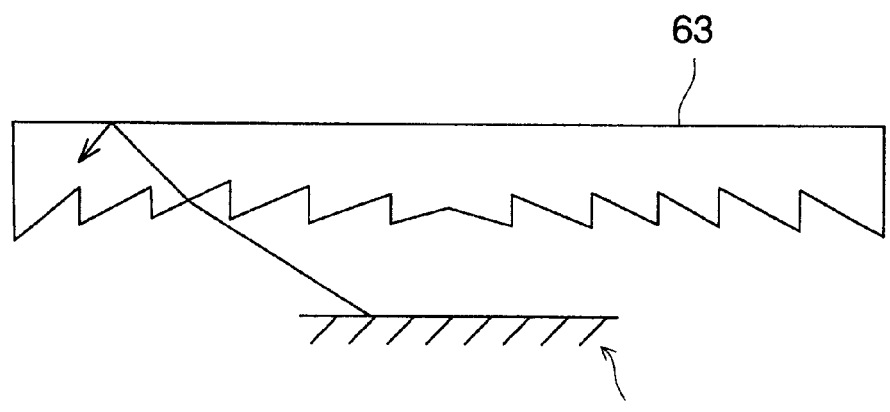
FIG. 20 shows an explanatory illustration of the light diverging effect.

Conversely, when the light diverging section is formed over the peripheral area of optical panel 3, as shown in FIG. 20, it is difficult to emit light rays toward a desirable direction, since the total reflection of light rays coming at a large angle of incident will easily occurs in optical panel 3.

Therefore, in the strobe light-emitting section, embodied in the present invention, the light diverging section is formed only in the central area of optical panel 3.

Figure 21:
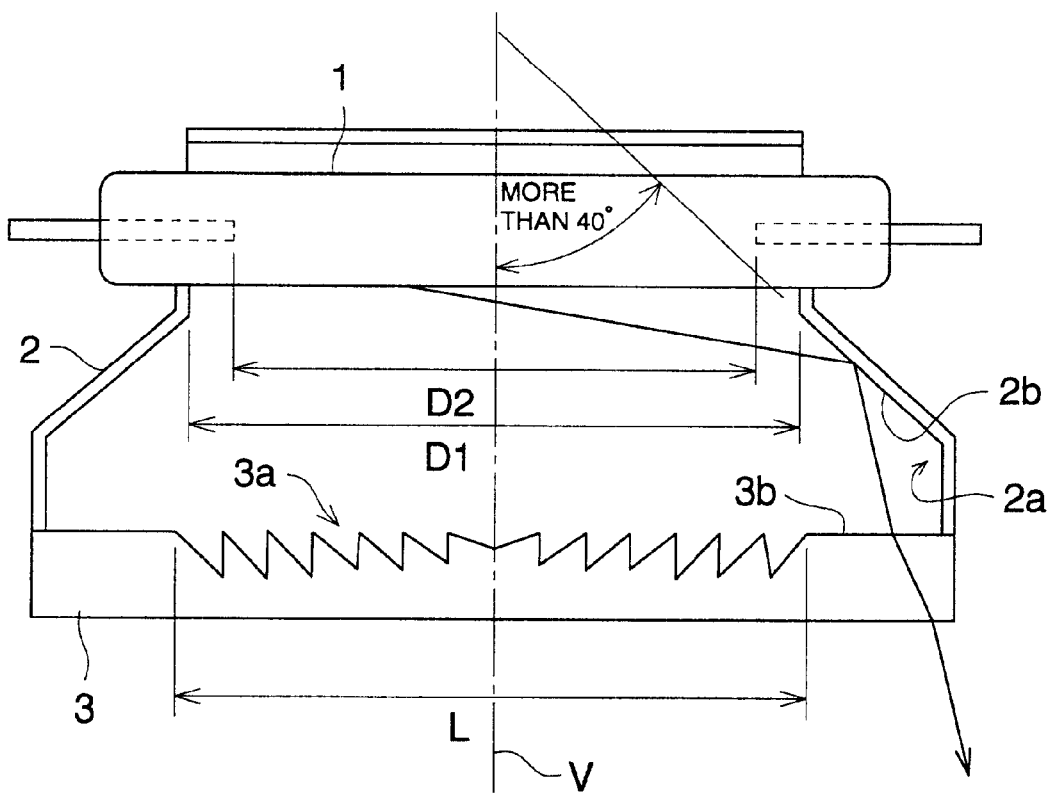
FIG. 21 shows a horizontal cross-sectional view of the strobe light emitting section, embodied in the present invention.

FIG. 21 shows a horizontal cross-sectional view of the strobe light-emitting section structured as mentioned above, while FIG. 22(A), FIG. 22(B) and FIG. 22(C) show a upper side view of optical panel 3, a front side view of optical panel 3 as viewed from the light-emitting tube, a side view of optical panel 3, respectively.

In FIG. 21, Fresnel lens 3a, serving as the diverging section, is formed only in the central area of optical panel 3 being opposite light-emitting tube 1. As clearly shown in FIG. 22(A), FIG. 22(B) and FIG. 22(C), Fresnel lens 3a is cylindrically formed in parallel in the direction orthogonal to the longitudinal direction of light-emitting tube 1. Therefore, the abovementioned total reflection in the optical panel 3 hardly occurs and the strobe light emitted from light-emitting tube 1 can sufficiently illuminate the periphery of the subject.

Incidentally, it is desirable that length L of Fresnel lens 3a in the longitudinal direction of light-emitting tube 1 is substantially equal to length D1 of light-emitting tube 1 located within the interior of reflector 2 in the longitudinal direction of it.

Further, it is more desirable that length L is set in a range of 70%–120% (furthermore desirably, 90%–120%) of length D2, being an effective length in which light-emitting tube 1 actually emits light between the two electrodes located at the both ends of it. Under the above condition, it becomes possible to obtain a maximum efficiency and the light distribution being suitable for the wide-angle lens.

Figure 22:
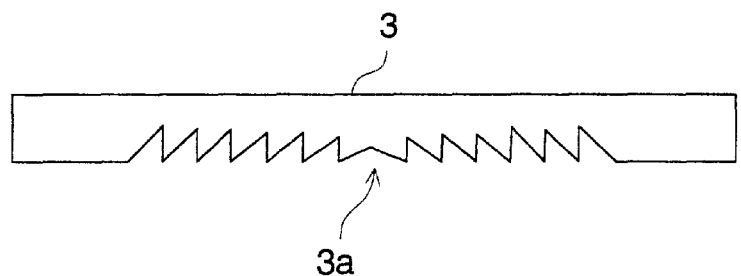
FIG. 22(A), FIG. 22(B) and FIG. 22(C) show a upper side view of the optical panel, a front side view of the optical panel viewing from the light-emitting tube, a side view of the optical panel, respectively.
Figure 22:
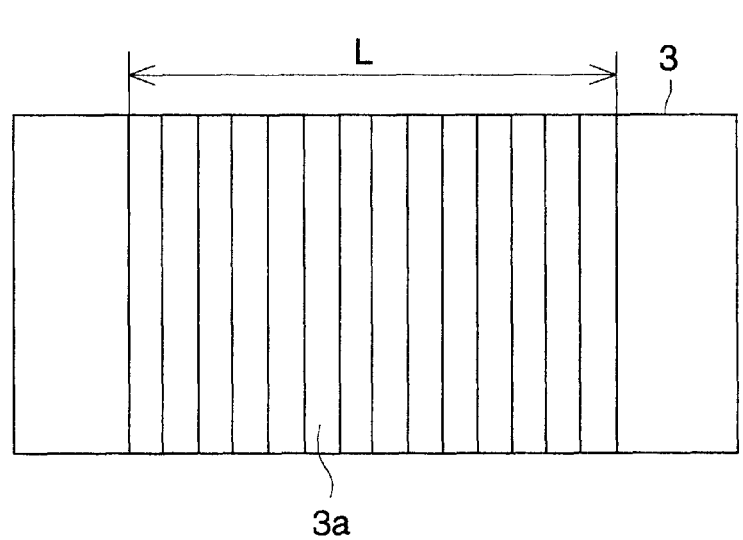
Figure 22:
Figure 23:
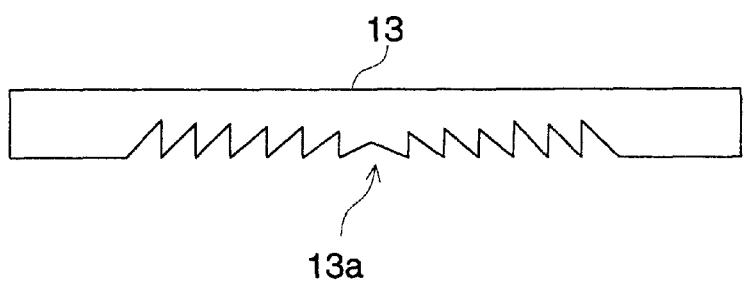
FIG. 23(A), FIG. 23(B) and FIG. 23(C) show a upper side view of the optical panel, a front side view of the optical panel viewing from the light-emitting tube, a side view of the optical panel, respectively, in another embodiment.
Figure 23:
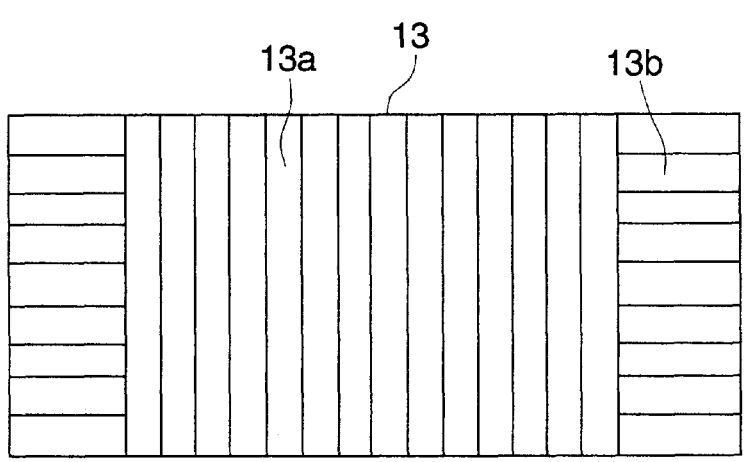
Figure 23:
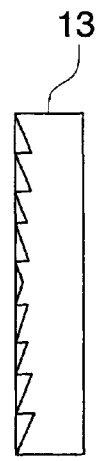

Alternatively, it is also applicable to employ an optical panel shown in FIG. 23, instead of the optical panel shown in FIG. 22. FIG. 23(A), FIG. 23(B) and FIG. 23(C) show a upper side view of optical panel 13, a front side view of optical panel 13 viewing from the light-emitting tube, a side view of optical panel 13, respectively.

A Fresnel lens 13a is formed only in the central area of optical panel 13 shown in FIGS. 23(A), (B) and (C), in a same manner as aforementioned. In the peripheral area of optical panel 13, however, Fresnel lens 13b is formed in the direction parallel to the longitudinal direction of light-emitting tube 1, instead of being a flat surface. As a result, it becomes possible to improve the distribution characteristics of the luminous intensity in the peripheral area.

Figure 24:
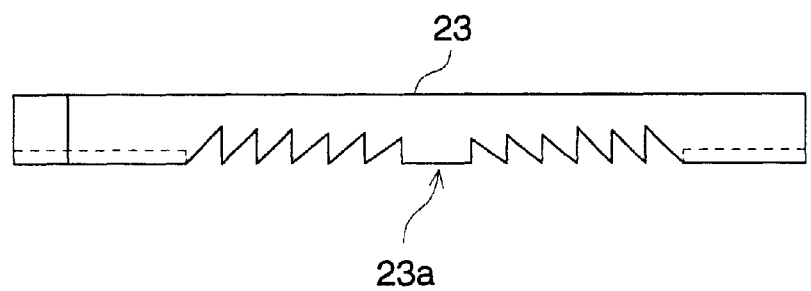
FIG. 24(A), FIG. 24(B) and FIG. 24(C) show a upper side view of the optical panel, a front side view of the optical panel viewing from the light-emitting tube, a side view of the optical panel, respectively, in still another embodiment.
Figure 24:
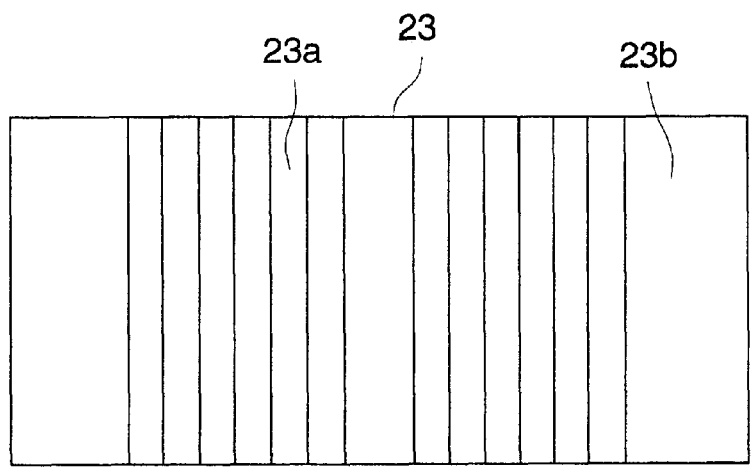
Figure 24:
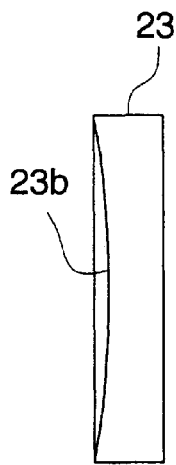

Alternatively, it is also applicable to employ an optical panel shown in FIG. 24. FIG. 24(A), FIG. 24(B) and FIG. 24(C) show a upper side view of optical panel 23, a front side view of optical panel 23 viewing from the light-emitting tube, a side view of optical panel 23, respectively.

In the central area of optical panel 23 shown in FIGS. 24(A), (B) and (C), Fresnel lens 23a is formed at both sides of flat surface section 23b located at the center of it. In addition, in the peripheral area of optical panel 23, concaved cylindrical lens 23c is formed in such a manner that the centerline of cylindrical lens 23c is arranged in parallel to the longitudinal direction of light-emitting tube 1. As a result, it becomes possible to increase the light intensity at the central area and to improve the distribution characteristics of the luminous intensity in the peripheral area. In addition, it is desirable that a flat surface section is formed at the center portion of the light diverging section, such as Fresnel lens, etc., which would improve a photographing performance and a quality of photographed images.

Figure 25:
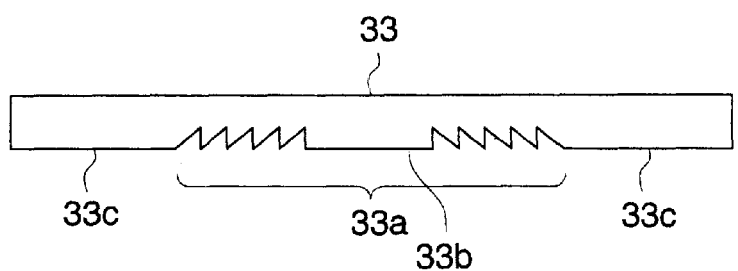
FIG. 25(A), FIG. 25(B) and FIG. 25(C) show a upper side view of the optical panel, a front side view of the optical panel viewing from the light-emitting tube, a side view of the optical panel, respectively, in still another embodiment.
Figure 25:
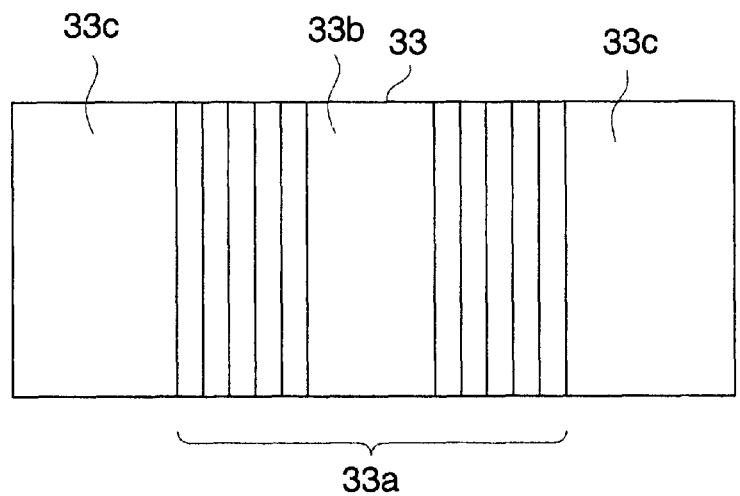
Figure 25:

Still alternatively, it is also applicable to employ an optical panel shown in FIG. 25. FIG. 25(A), FIG. 25(B) and FIG. 25(C) show a upper side view of optical panel 33, a front side view of optical panel 33 viewing from the light-emitting tube, a side view of optical panel 33, respectively.

In the central area of optical panel 33 shown in FIGS. 25(A), (B) and (C), Fresnel lens 33a is formed at both sides of flat surface section 33b located at the center of it, wherein the width of flat surface section 33b is longer than the width of flat surface section 23b shown in FIG. 24. In addition, flat surface 33c is formed at both sides of Fresnel lens 33a. As a result, it becomes possible to further increase the light intensity at the central area, compared to the aforementioned optical panels and to also improve the distribution characteristics of the luminous intensity in the peripheral area.

Figure 26:
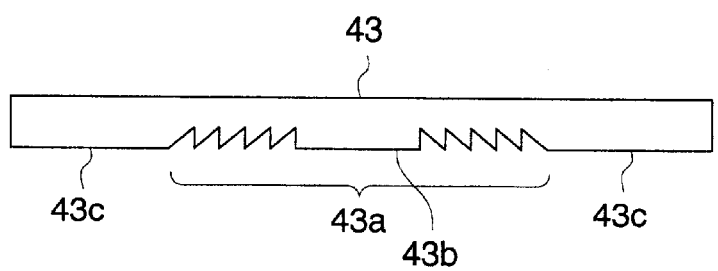
FIG. 26(A), FIG. 26(B) and FIG. 26(C) show a upper side view of the optical panel, a front side view of the optical panel viewing from the light-emitting tube, a side view of the optical panel, respectively, in still another embodiment.
Figure 26:
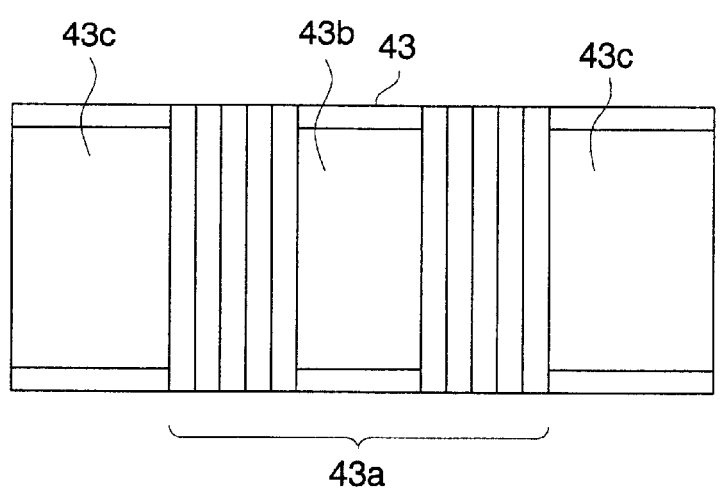
Figure 26:
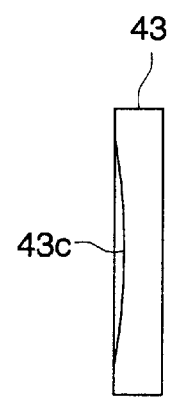

Still alternatively, it is also applicable to employ an optical panel shown in FIG. 26. FIG. 26(A), FIG. 26(B) and FIG. 26(C) show a upper side view of optical panel 43, a front side view of optical panel 43 viewing from the light-emitting tube, a side view of optical panel 43, respectively.

In the central area of optical panel 43 shown in FIGS. 26(A), (B) and (C), Fresnel lens 43a is formed at both sides of concaved cylindrical lens 43b which is formed in such a manner that the centerline of cylindrical lens 23c is arranged parallel to the longitudinal direction of light-emitting tube 1. In addition, concave cylindrical lens 43c, being the same as cylindrical lens 43b, is formed at both sides of Fresnel lens 43a. As a result, it becomes possible to increase the light intensity in the central area, in a similar manner as the aforementioned optical panels, and to improve the distribution characteristics of the luminous intensity in the peripheral area, specifically in the vertical direction.

Incidentally, in the case that either a flat surface or a concave cylindrical lens is formed at the center of the Fresnel lens in the optical panels, as described above referring to FIG. 24(A) through FIG. 26(C), it is desirable that the relationship between length L of the Fresnel lens in the longitudinal direction of light-emitting tube 1 and length L1 of either the flat surface or the concaved cylindrical lens fulfills the following equation.

$$1/5 \leq L1/L \leq 1/2$$

In addition, the shape of reflector 2 also considerably affects the distribution characteristics of the luminous intensity in the longitudinal direction of light-emitting tube 1.

Figure 27:
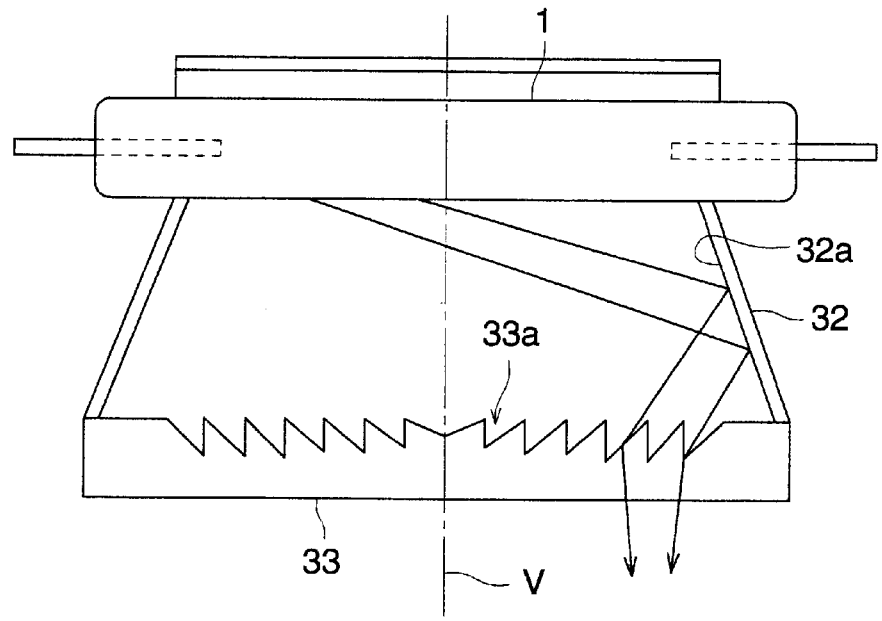
FIG. 27 shows a horizontal cross-sectional view of an undesirable shape of the strobe light emitting section.

For instance, in a horizontal cross-sectional view of a strobe light-emitting section, shown in FIG. 27, the shape of reflector 52 is different from the shape of reflector 2 shown in FIG. 21. When assuming an imaginary surface V orthogonal to the longitudinal direction of light-emitting tube 1, the inner sidewall 52a of reflector 52, located opposite imaginary surface V, inclines at an angle of around 20° with respect to imaginary surface V. Accordingly, as shown in FIG. 27, since light rays emitted diagonally from light-emitting tube 1 are initially reflected by inner sidewall 52a, and then, enter into Fresnel lens 53a formed in the central area of optical panel 53, light rays emitted from optical panel 53 rearly travel to the peripheral directions, resulting in undesirable deterioration of the distribution characteristics of the luminous intensity.

To overcome the abovementioned drawback, it is desirable that, as shown in FIG. 21, at least a half of inner sidewall 2a of reflector 2, located opposite imaginary surface V, is a tilted-surface 2b and the tilt angle with respect to imaginary surface V is set at more than 40°. As a result, since light rays emitted diagonally from light-emitting tube 1 are initially reflected by tilted-surface 2b, and then, enter into flat surface 3b formed in the peripheral area of optical panel 3, the distribution characteristics of the luminous intensity in the peripheral area is not deteriorated.

Incidentally, in the abovementioned embodiments, the diverging section, being the Fresnel lens, is arranged at the side directly opposite light-emitting tube 1. This is because light rays emitted in the direction perpendicular to the Fresnel lens can be eliminated by this arrangement, resulting in a desirable improvement of the distribution characteristics of the luminous intensity.

Further, although the diverging section is formed as a Fresnel lens in the abovementioned embodiments, a row of prisms, in which a plurality of prisms are arranged in parallel to exhibit a light-diverging effect, is also applicable for the diverging section.

Still further, a negative lens surface is also applicable for the diverging section. In this case, however, the thickness of such an optical panel would be excessive, compared to that of an optical panel employing either the Fresnel lens or the row of prisms.

Figure 28:
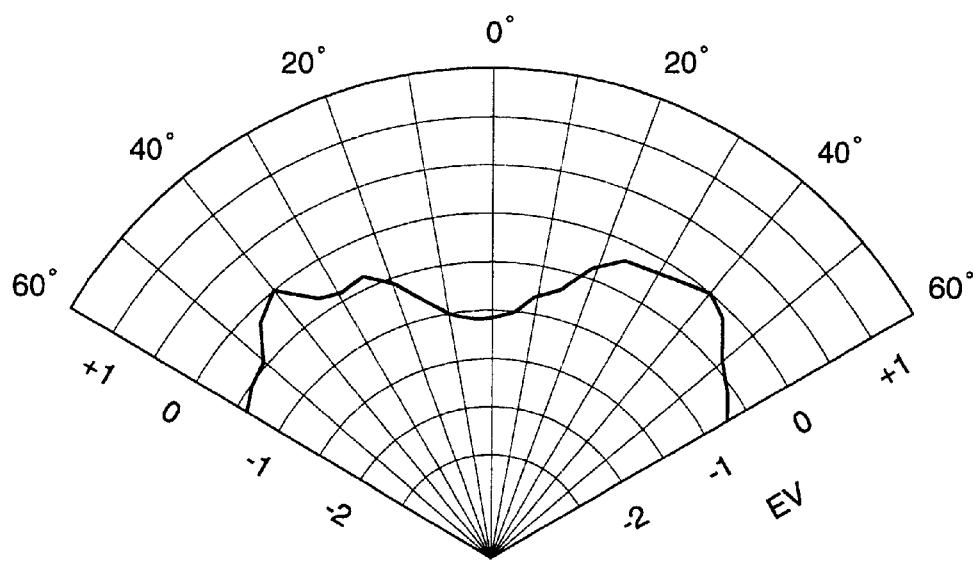
FIG. 28 shows distribution characteristics of the luminous intensity for the strobe device, embodied in the present invention.

Finally, FIG. 28 shows distribution characteristics of the luminous intensity in the longitudinal direction of the light-emitting tube, exhibited by the strobe light-emitting section shown in FIG. 21.

Accordingly, a more uniform luminous intensity can be obtained even for such a subject as being flat surface perpendicular to the strobe light axis. In addition, it is also possible to brightly illuminate peripheral backgrounds locating farther than the subject. Accordingly, it becomes possible to obtain a natural photograph with the feeling of liveliness, in which backgrounds are brightly depicted. Further, since it is possible to distribute the luminous intensity over a wide-angle range, it becomes possible to provide a strobe device, which desirably suites a wide-angle lens.

Next, a camera and a lens-fitted film unit, which incorporate the strobe device embodied in the present invention, will be detailed in the following.

Figure 29:
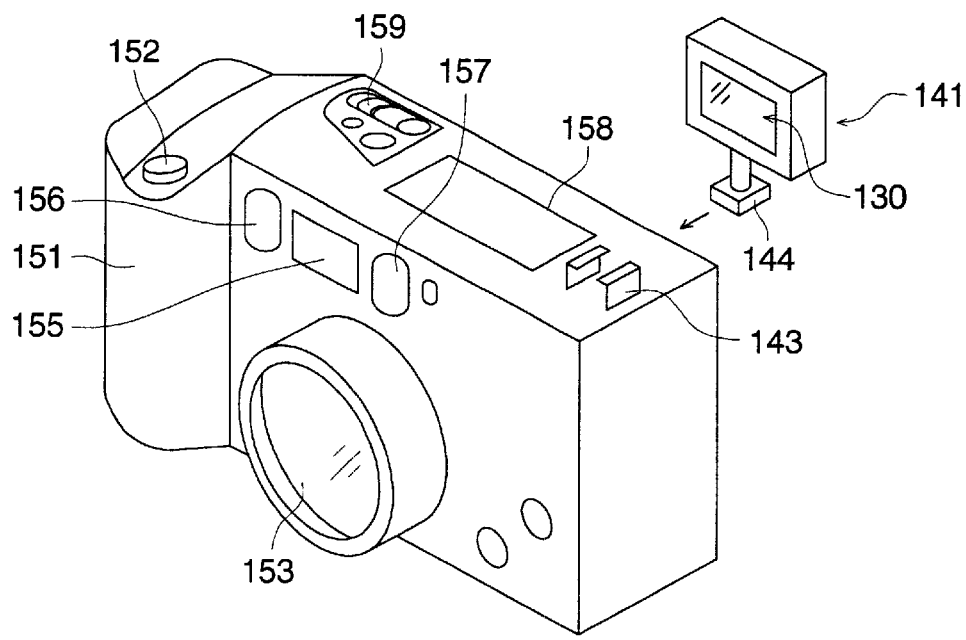
FIG. 29 shows a perspective view of a silver-halide camera, in which the strobe device is not integrally incorporated.

FIG. 29 shows a perspective view of silver-halide camera 145, in which a strobe device is not integrally incorporated, and strobe unit 141 incorporated with the strobe device 130, illustrating a state of attaching rectangular hot-shoe contact 144 of strobe unit 141 into accessory-shoe 143 of silver-halide camera 145.

Silver-halide camera 145 comprises photographic lens 153, grip 151, release button 152, finder 155, light emitting window 156 and light receiving window 157 for the automatic focusing operation, etc. and further comprises display 65 4391 section 158 for displaying various kinds of information, main-switch 159, etc.

Figure 30:
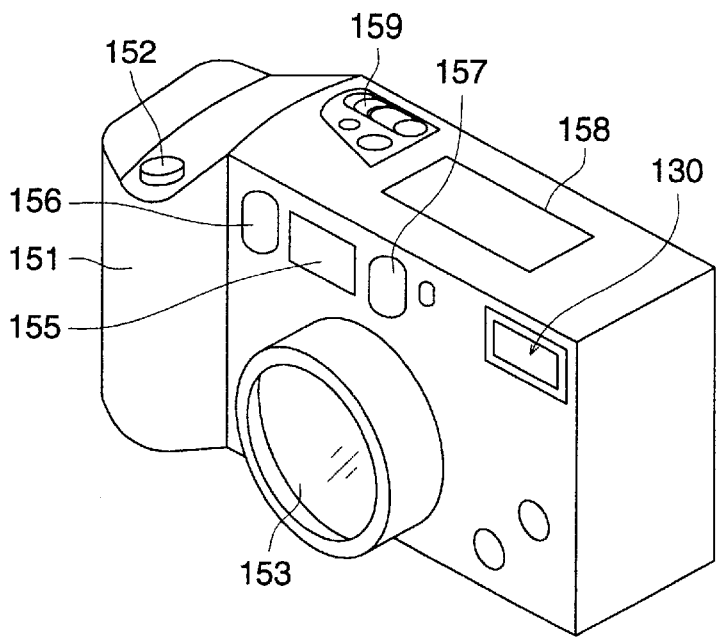
FIG. 30 shows a perspective view of a silver-halide camera, in which the strobe device is integrally incorporated.

While, FIG. 30 shows a perspective view of silver-halide camera 146, in which strobe device 130 is integrally incorporated, and other principle configuration is the same as silver-halide camera 145 mentioned above.

Even in either silver-halide camera 145 attached with strobe unit 141 or silver-halide camera 146 mentioned above, it is possible for strobe device 130 to sufficiently cope with the trend of widening the viewing angle of photographic lens 153 and to exhibit advantageous features and effects of efficiently using light rays emitted from the aforementioned light-emitting tube.

Next, referring to FIG. 31 and FIG. 32, a lens-fitted film unit, which incorporates the strobe device embodied in the present invention, will be detailed in the following.

Figure 31:
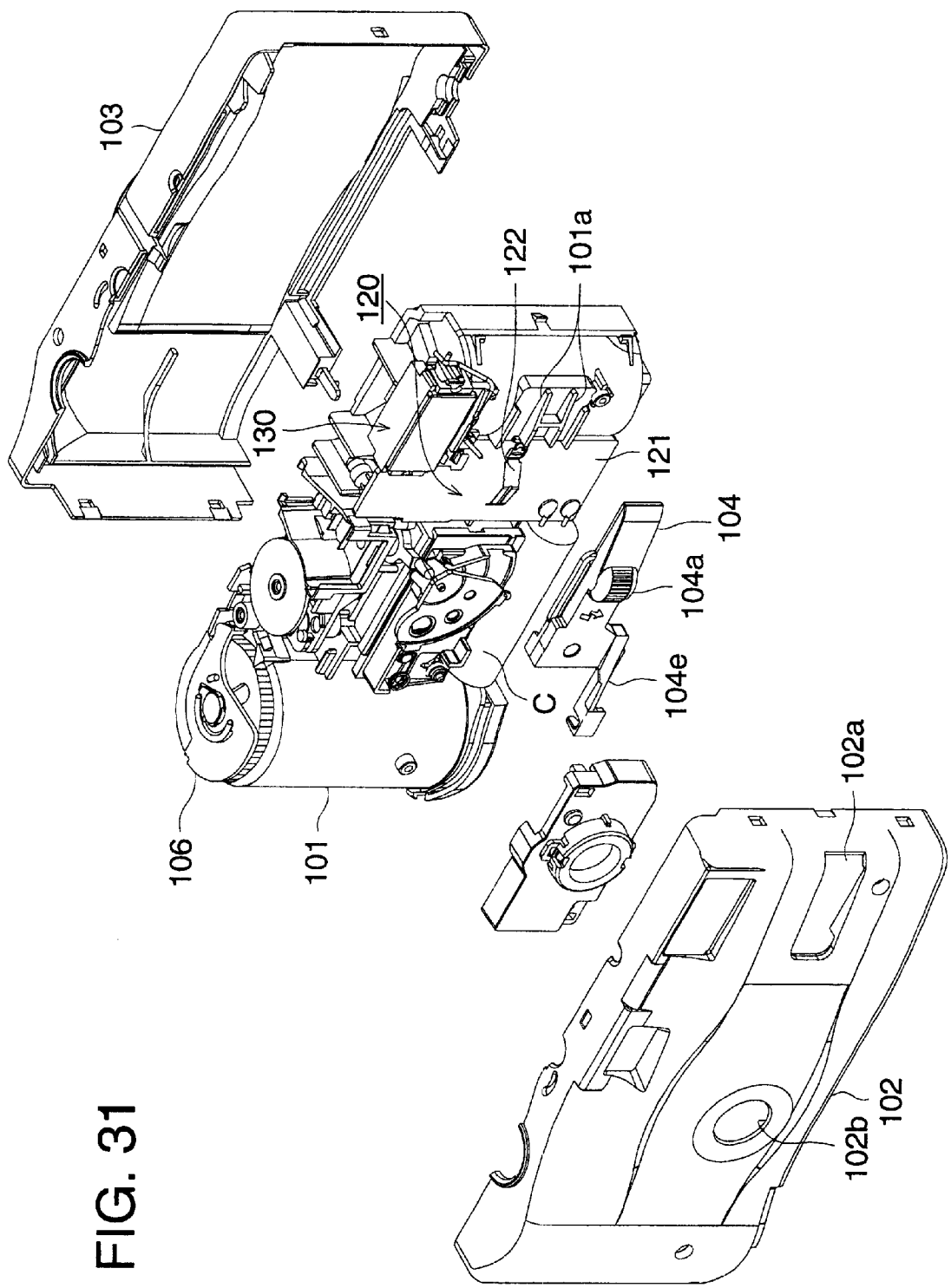
FIG. 31 shows an exploded perspective view of a lens-fitted film unit, in which the strobe device is integrally incorporated.

In FIG. 31, numeral 101 indicates a unit main body, which holds a film, and comprises a shutter unit, strobe unit 120 incorporated with strobe device 130 embodied in the present invention and various kinds of image capturing mechanisms such as a film winding mechanism, etc. Numeral 102 indicates a front cover, which covers unit main body 101 at the front side. Numeral 103 indicates a rear cover, which covers unit main body 101 at the rear side.

Numeral 104 indicates an operating slider, which turns main switch 122 either ON or OFF to activate strobe unit 120 or to change the aperture of the lens, when photographer manually slides operating slider 104.

Operating slider 104 is held with strobe unit 120 by overlapping it on strobe unit 120 and attaching front cover 102, in a manner such that guide walls formed at both upper and lower rear sides of operating slider 104 are fitted on ribs 101a, allowing operating slider 104 to freely slide in a longitudinal direction of unit main body 101.

Incidentally, numerals 106, 102b and symbol C, in FIG. 31, indicate a film winding knob, a lens window and a capacitor for strobe unit 120, respectively. According to the abovementioned embodiment of the lens-fitted film unit, since strobe unit 120 is integrally incorporated in it, it is possible to sufficiently cope with widening the viewing angle of lens L1 and lens L2, which are to be described later, and to exhibit advantageous features and effects of efficiently using light rays emitted from the light-emitting tube, as aforementioned.

Figure 32:
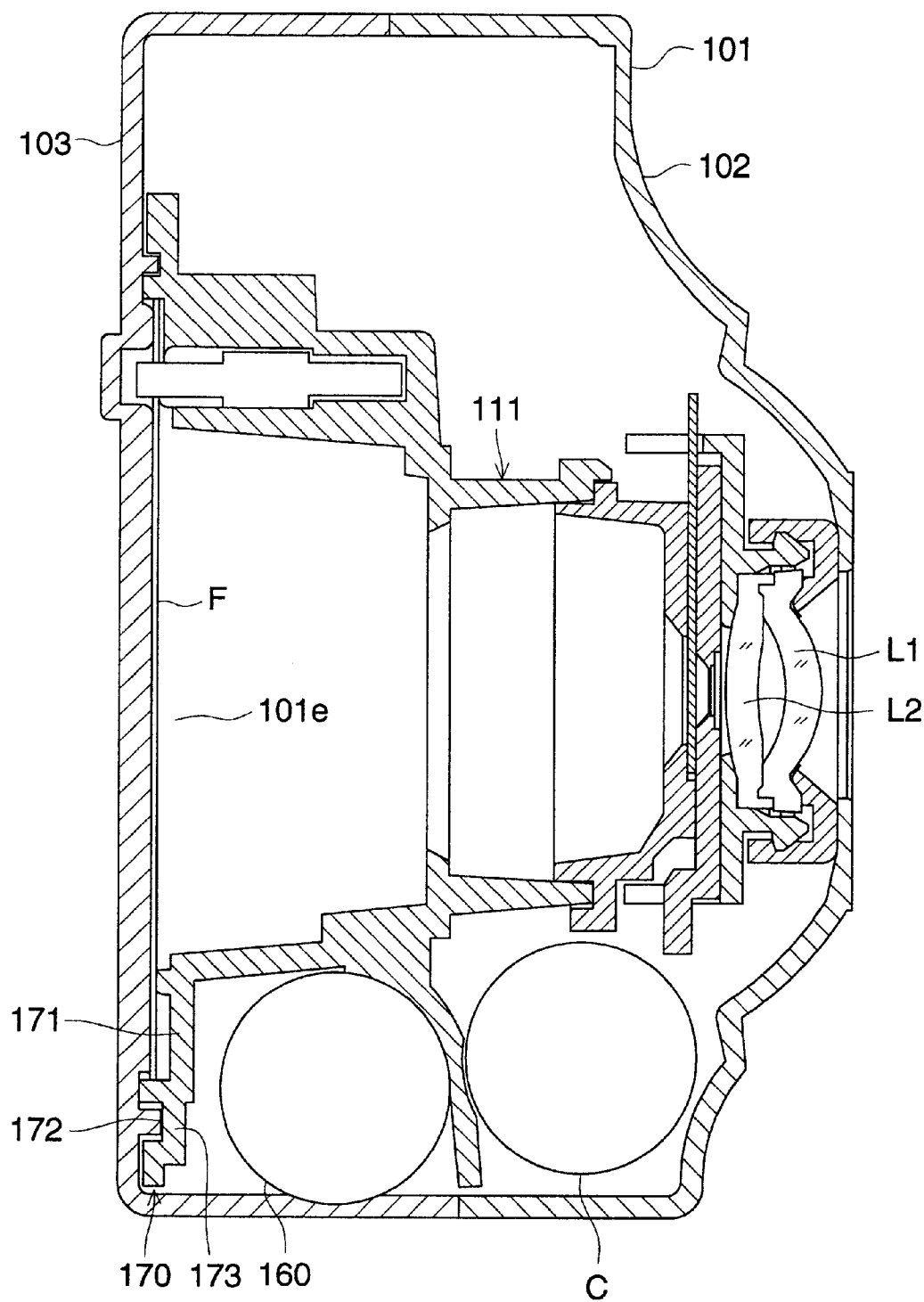
FIG. 32 shows a cross-sectional view of the lens-fitted film unit, embodied in the present invention.

FIG. 32 shows a rough cross-sectional view of the above-mentioned embodiment of the lens-fitted film unit. In FIG. 32, photographic image frame 101*f*, having a predetermined aperture in a rectangular shape, is formed between unit main body 101 and rear cover 103, and further, exposing section 101*e* is equipped, in which subject images are projected on film F, fitted in rear cover 103, by photographic lenses L1 and L2, to expose and photograph them on film F.

Figure 33:
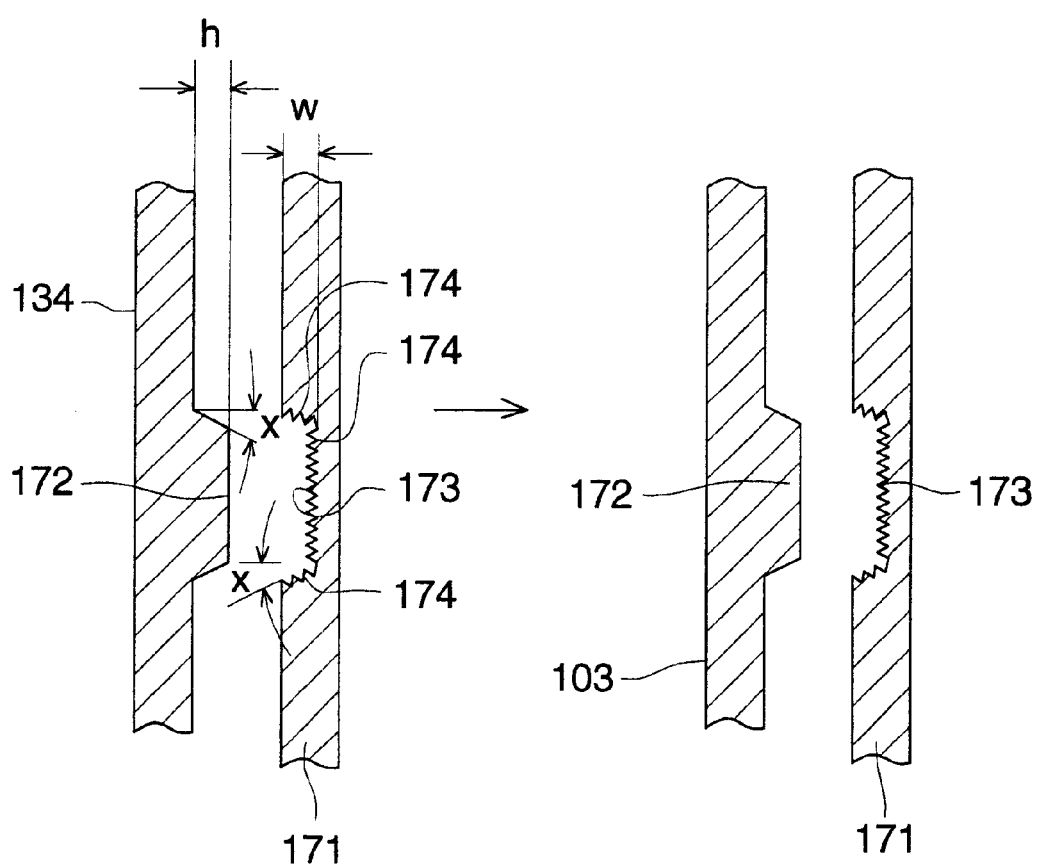
FIG. 33 shows a cross-sectional view of a light-sealing structure introduced at a joint section between the rear cover and the main body of the lens-fitted film unit.

In the lens-fitted film unit as mentioned above, it is desirable that light-sealing structure 170, also shown in FIG. 33, is introduced at a joint section with rear cover 103, located near exposing section 101*e*.

Specifically, light-sealing structure 170 is formed in such a manner that convex portion 172, formed on rear cover 103, is fitted to concave portion 173, formed on joint member 171 for joining unit main body 101 with rear cover 103, to seal a light entering into the joint section. It is desirable that rough-forging section 147 is formed on at least one of surfaces of convex portion 172 and concave portion 173 or all over the each surface.

According to light-sealing structure 170 mentioned above, since intensity of light, entering toward exposing section 101*e*, can be attenuated due to a diffused reflection caused by rough-forging section 147, it is possible to exhibit a sufficient light-sealing function, and to prevent film F, sent to exposing section 101*e*, from being sensitized by an inherently unnecessary light entering at the time of non-image capturing mode.

Further, in a structure such that the top surface of convex portion 172 contacts the bottom surface of concave portion 173, the contacted surface also contributes to the light-sealing function, resulting in exhibition of more sufficient light-sealing effect.

The rise angle a of convex portion 172 and the fall angle x of concave portion 173 are set at an angle in the range of 3°–45°, desirably in the range of 5°–15°.

Accordingly, since convex portion 172 and concave portion 173 can be easily extracted from the molds when forming them, it becomes possible to simplify the manufacturing process of them.

Further, the height h of convex portion 172 and the depth w of concave portion 173 are set at a size in the range of 0.3 mm–1.5 mm, desirably in the range of 0.5 mm–0.8 mm. Accordingly, it becomes possible to provide light-sealing structure 170 having such advantageous features as easy for forming by the mold, easy for securing a surface for rough-forging section 147, possible to simplify the manufacturing process and possible to exhibit a sufficient light-sealing function.

According to light-sealing structure 170, it becomes possible for the lens-fitted film unit to prevent an external light form entering into the conveyance region of film F and to prevent film F from being sensitized by an unnecessary light.

In the same manner as described above, light-sealing structure 170 also can be applied for the film-conveying region of either silver-halide camera 145 attached with strobe unit 141 or silver-halide camera 146 aforementioned.

Incidentally, the strobe device, embodied in the present invention, is also applicable for digital still cameras. In addition, the strobe device, embodied in the present invention, is especially suited for an image capturing apparatus having a half viewing angle being greater than 240 in a direction of a long side of a photographed image frame and for an image capturing apparatus having a photographic lens, whose focal length is shorter than 26 mm.

According to the present invention detailed in the above, an uniform luminous intensity can be obtained even for such a subject as being flat surface perpendicular to the strobe light axis. In addition, it becomes possible to obtain a natural photograph with the feeling of liveliness, in which backgrounds are brightly photographed. Further, it also becomes possible to provide a strobe device, which can sufficiently cope with the trend of widening the viewing angle of the photographic lens, and can suppress unnecessary diffusion of a light emitted from the light-emitting tube, and can efficiently utilize a light emitted from light-emitting tube.

Still further, according to the present invention, it also becomes possible to provide an image capturing apparatus, which can sufficiently cope with the trend of widening the viewing angle of the photographic lens, and can suppress unnecessary diffusion of a light emitted from the light-emitting tube, and can efficiently utilize a light emitted from light-emitting tube.

Disclosed embodiment can be varied by a skilled person without departing from the spirit and scope of the invention.

What is claimed is:

1. A strobe device, comprising:

a reflector to reflect a strobe light;

a light-emitting tube, mounted in an interior of said reflector, to emit said strobe light; and an optical panel, mounted in front of said light-emitting tube, to transmit said strobe light, wherein a curve of luminous intensity of said strobe light exhibits a first peak luminous intensity and a second peak luminous intensity in a distribution characteristic of luminous intensity, which is established on a plane including a strobe light axis in respect to said strobe light emitted from said strobe device, and said first peak luminous intensity exists in a left-side region of said distribution characteristic of luminous intensity in a direction inclined to said strobe light axis, while said second peak luminous intensity exists in a right-side region of said distribution characteristic of luminous intensity in another direction inclined to said strobe light axis; and wherein the following conditional equation is fulfilled, $$(4/3) \times A \geq K_P \geq (1/5) \times A$$

where: A is a half viewing angle of a photographic lens, which is incorporated in an image capturing apparatus equipped with said strobe device, and $K_p$ is an illumination angle for either said first peak luminous intensity or said second peak luminous intensity with reference to said strobe light axis.

2. The strobe device of claim 1, which fulfills a following conditional equation, $$[4 \times \{(\cos(K_P))^{-4} - 1\} \times Q_C] + Q_C \geq Q_{KP} \geq [0.1 \times \{(\cos(K_P))^{-4} - 1\} \times Q_C] + Q_C$$

where: $K_P$; an illumination angle for said first or second peak luminous intensity with reference to said strobe light axis, $Q_C$; a luminous intensity in a direction of said strobe light axis, $Q_{KP}$; said first or second peak luminous intensity.

3. The strobe device of claim 1, wherein said reflector comprises a concave reflection surface and a side reflection surface arranged at each side of said concave reflection surface, said side reflection surface is inclined to said light-emitting tube at such an angle that said side reflection surface reflects said strobe light, emitted from said light-emitting tube, so as to emit said strobe light toward a direction of being apart from said strobe light axis and toward a direction of not crossing said strobe light axis.

4. The strobe device of claim 3, wherein said side reflection surface comprises a sub-reflection surface being orthogonal to a longitudinal direction of said light-emitting tube.

5. The strobe device of claim 1, which fulfills a following conditional equation, $$1.5 \leq W/L \leq 2.0$$

where: L; an effective illuminating length of said light-emitting tube, W; a length of said strobe panel in a longitudinal direction of said light-emitting tube.

6. The strobe device of claim 1, wherein said light-emitting tube is formed in a cylindrical shape and said reflector comprises a concave reflection surface, said strobe device fulfills following conditional equations, $$3.0U < W1 < 5.2U$$

$$1.2U < W2 < 3.5U$$

$$2U < D < 5U$$

where: W1; a width at a front end of said concave reflection surface in regard to a cross-sectional view of said concave reflection surface in a direction orthogonal to a longitudinal direction of said light-emitting tube, W2; a width of said concave reflection surface at a center axis of said light-emitting tube in regard to a cross-sectional view of said concave reflection surface in a direction orthogonal to a longitudinal direction of said light-emitting tube, D; a distance from a front end of said concave reflection surface to said center axis of said light-emitting tube, and U; a distance from said center axis of said light-emitting tube to a rear end of said concave reflection surface.

7. The strobe device of claim 1, wherein said light-emitting tube is formed in a cylindrical shape and said reflector comprises a concave reflection surface, and in regard to a cross-sectional view of said concave reflection surface in a direction orthogonal to a longitudinal direction of said light-emitting tube, in case that a front end point of said concave reflection surface, an intersection point of said concave reflection surface and a straight line, which goes through a center axis of said light-emitting tube and is perpendicular to said strobe light axis, and a rear end point of said concave reflection surface on said strobe light axis, are defined as P, Q and V, respectively, all of points, residing on said concave reflection surface between points P and Q, are located opposite a center axis of said light-emitting tube with respect to a line P-Q, while all of points, residing on said concave reflection surface between points Q and V, are located opposite a center axis of said light-emitting tube with respect to a line Q-V, and under the above condition, said strobe device fulfills following conditional equations, $$0.05 < \Delta 1/U < 0.4$$

$$0.07 < \Delta 2/U < 0.5$$

where: $\Delta 1$; a maximum distance from a point, residing on said concave reflection surface between points P and Q, to said line P-Q, $\Delta 2$; a maximum distance from a point, residing on said concave reflection surface between points Q and V, to said line Q-V, and U; a distance from said center axis of said light-emitting tube to a rear end of said concave reflection surface.

8. The strobe device of claim 6, wherein said light-emitting tube is apart from said concave reflection surface.

9. The strobe device of claim 6, which fulfills a following conditional equation, $$0.5 < T/U < 1.5$$

where: T; an outer diameter of said light-emitting tube.

10. The strobe device of claim 1, wherein said optical panel comprises a light diverging section, located at a center area in a longitudinal direction of said light-emitting tube, to diverge said strobe light toward periphery, said light diverging section comprises at least one of such surfaces as a Fresnel lens, a negative lens and a row of prisms.

11. The strobe device of claim 10, wherein, in a longitudinal direction of said light-emitting tube, a length of said light diverging section is 90%–120% of a length of said light-emitting tube located within an interior of said reflector.

12. The strobe device of claim 10, wherein, in a longitudinal direction of said light-emitting tube, a length of said light diverging section is 70%–120% of a length of a light-emitting portion of said light-emitting tube.

13. The strobe device of claim 10, wherein said diverging section comprises a flat portion, located at a center area of said diverging section in a longitudinal direction of said light-emitting tube.

14. The strobe device of claim 1, wherein said strobe device exhibits a maximum luminous intensity without a range of viewing angle in a direction of at least one of a long side, a short side and a diagonal of a photographed image frame projected by a photographic lens, which is incorporated in an image capturing apparatus equipped with said strobe device.

15. The strobe device of claim 1, wherein said half viewing angle A is equivalent to a half viewing angle of a photographic lens having a focal length shorter than 26 mm in reference to a 135-film.

16. The strobe device of claim 15, wherein the following conditional equation is fulfilled, $$(9/10) \times A \geq K_P \geq (1/2) \times A.$$

17. An image capturing apparatus, comprising:

a photographic lens; and a strobe device, which comprises a reflector to reflect a strobe light forward, a light-emitting tube, mounted in an interior of said reflector, to emit said strobe light, and an optical panel, mounted in front of said light-emitting tube, to transmit said strobe light, wherein a curve of luminous intensity of said strobe light exhibits a first peak luminous intensity and a second peak luminous intensity in a distribution characteristic of luminous intensity, which is established on a plane including a strobe light axis in respect to said strobe light emitted from said strobe device, and said first peak luminous intensity exists in a left-side region of said distribution characteristic of luminous intensity in a direction inclined to said strobe light axis, while said second peak luminous intensity exists in a right-side region of said distribution characteristic of luminous intensity in another direction inclined to said strobe light axis; and wherein the following conditional equation is fulfilled, $$(4/3) \times A \geq K_P \geq (1/5) \times A$$

where: A is a half viewing angle of a photographic lens, which is incorporated in an image capturing apparatus equipped with said strobe device, and $K_P$ is an illumination angle for either said first peak luminous intensity or said second peak luminous intensity with reference to said strobe light axis.

18. The image capturing apparatus of claim 17, which fulfills a following conditional equation, $$[4 \times \{(\cos(K_P))^{-4} - 1\} \times Q_C] + Q_C \geq Q_{KP} \geq [0.1 \times \{(\cos(K_P))^{-4} - 1\} \times Q_C] + Q_C$$

where: $K_P$; an illumination angle for said first or second peak luminous intensity with reference to said strobe light axis, $Q_C$; a luminous intensity in a direction of said strobe light axis, $Q_{KP}$; said first or second peakuminous intensity.

19. The image capturing apparatus of claim 17, wherein said reflector comprises a concave reflection surface and a side reflection surface arranged at each side of said concave reflection surface, said side reflection surface is inclined to said light-emitting tube at such an angle that said side reflection surface reflects said strobe light, emitted from said light-emitting tube, so as to emit said strobe light toward a direction of being apart from said strobe light axis and toward a direction of not crossing said strobe light axis.

20. The image capturing apparatus of claim 17, wherein said light-emitting tube is formed in a cylindrical shape and said reflector comprises a concave reflection surface, said strobe device fulfills following conditional equations, $$3.0U < W1 < 5.2U$$

$$1.2U < W2 < 3.5U$$

$$2U < D < 5U$$

where: W1; a width at a front end of said concave reflection surface in regard to a cross-sectional view of said concave reflection surface in a direction orthogonal to a longitudinal direction of said light-emitting tube, W2; a width of said concave reflection surface at a center axis of said light-emitting tube in regard to a cross-sectional view of said concave reflection surface in a direction orthogonal to a longitudinal direction of said light-emitting tube, D; a distance from a front end of said concave reflection surface to said center axis of said light-emitting tube, and U; a distance from said center axis of said light-emitting tube to a rear end of said concave reflection surface.

21. The image capturing apparatus of claim 17, wherein said optical panel comprises a light diverging section, located at a center area in a longitudinal direction of said light-emitting tube, to diverge said strobe light toward periphery, said light diverging section comprises at least one of such surfaces as a Fresnel lens, a negative lens and a row of prisms.

22. The image capturing apparatus of claim 21, wherein said diverging section comprises a flat portion, located at a center area of said diverging section in a longitudinal direction of said light-emitting tube.

23. The image capturing apparatus of claim 17, wherein said strobe device exhibits a maximum luminous intensity without a range of viewing angle in a direction of at least one of a long side, a short side and a diagonal of a photographed image frame projected by said photographic lens.

24. The image capturing apparatus of claim 17, wherein said image capturing apparatus is a lens-fitted film unit equipped with said strobe device.

25. The image capturing apparatus of claim 17, wherein said image capturing apparatus is a silver-halide film camera equipped with said strobe device.

26. The image capturing apparatus of claim 17, wherein said image capturing apparatus is a digital still camera equipped with said strobe device.

27. The image capturing apparatus of claim 17, wherein said half viewing angle A is equivalent to a half viewing angle of a photographic lens having a focal length shorter than 26 mm in reference to a 135-film.

28. The image capturing apparatus of claim 27, wherein the following conditional equation is fulfilled, $$(9/10) \times A \geq K_P \geq (1/2) \times A.$$

29. A reflector employed for a strobe device, comprising:

a concave reflection surface; and a side reflection surface arranged at each side of said concave reflection surface, wherein said side reflection surface is inclined to a light-emitting tube, which emits a strobe light in an interior of said concave reflection surface, at such an angle that said side reflection surface reflects said strobe light, so as to emit said strobe light toward a direction of being apart from a strobe light axis and toward a direction of not crossing said strobe light axis.

* * * * *